(12) United States Patent
Yamada et al.

(10) Patent No.: US 8,366,073 B2
(45) Date of Patent: Feb. 5, 2013

(54) RESIN MEMBER FOR VALVE

(75) Inventors: Hiroki Yamada, Nobeoka (JP); Yusuke Koizumi, Tokyo (JP)

(73) Assignee: Asahi Organic Chemicals Industry Co., Ltd., Miyazaki (JP)

( * ) Notice: Subject to any disclaimer, the term of this patent is extended or adjusted under 35 U.S.C. 154(b) by 1144 days.

(21) Appl. No.: 10/575,111

(22) PCT Filed: Oct. 8, 2004

(86) PCT No.: PCT/JP2004/015310
§ 371 (c)(1),
(2), (4) Date: Apr. 10, 2006

(87) PCT Pub. No.: WO2005/035663
PCT Pub. Date: Apr. 21, 2005

(65) Prior Publication Data
US 2007/0042190 A1    Feb. 22, 2007

(30) Foreign Application Priority Data
Oct. 10, 2003    (JP) ................... 2003-352703

(51) Int. Cl.
*F16K 25/00*    (2006.01)
(52) U.S. Cl. ........................................ 251/368
(58) Field of Classification Search .............. 251/305, 251/368; 428/413
See application file for complete search history.

(56) References Cited

U.S. PATENT DOCUMENTS 3,595,523 A * 7/1971 Felton ......................... 251/306
5,029,811 A   7/1991 Yamamoto et al.
(Continued)

FOREIGN PATENT DOCUMENTS

CN  1428361   11/2004
EP  1 065 361  1/2001
(Continued)

OTHER PUBLICATIONS

Second Notice of Reasons for Rejection, Application No. 200480029635.9 by State Intellectual Property Office of the Peoples Republic of China dated Sep. 12, 2008 with English Translation.
(Continued)

*Primary Examiner* — John K Fristoe, Jr.
*Assistant Examiner* — Andrew J Rost
(74) *Attorney, Agent, or Firm* — Buchanan Ingersoll & Rooney PC

(57) ABSTRACT

To provide a light-weight resin member, for a valve, which has high strength and can be used in a high-temperature atmosphere, and is also excellent in chemical resistance and corrosion resistance.

A resin member for a valve, which is produced by molding a molding material having a tensile strength of 80 to 400 MPa at normal temperature, and a resin member for a valve, which is produced by molding a molding material having a tensile strength of 75 to 350 MPa at 120° C. are disclosed. There is also disclosed a resin member for a valve, which is produced by molding a molding material comprising a resin composition containing an epoxy acrylate resin (A) having a hydroxyl value of 60 to 100, a polyisocyanate compound (B) having 0.1 to 1.5 isocyanate groups per one hydroxyl group of the epoxy acrylate resin (A), a curing agent (C) and an internal mold release agent (D), and 20 to 70% by weight of a fiber reinforcing material (E).

8 Claims, 9 Drawing Sheets

U.S. PATENT DOCUMENTS

| | | | |
|---|---|---|---|
| 5,391,665 A * | 2/1995 | Matsunaga et al. | 526/211 |
| 5,916,593 A | 6/1999 | de Haan | |
| 5,916,953 A * | 6/1999 | Jacoby et al. | 524/494 |
| 6,295,968 B2 * | 10/2001 | Torii et al. | 123/399 |
| 6,695,279 B2 * | 2/2004 | Takahashi et al. | 251/61 |
| 2003/0037831 A1 | 2/2003 | Nakamura et al. | |

FOREIGN PATENT DOCUMENTS

| | | |
|---|---|---|
| EP | 1 262 525 | 12/2002 |
| JP | 59-22376 | 2/1984 |
| JP | 62-134257 | 6/1987 |
| JP | 63-303279 A | 12/1988 |
| JP | 6-256456 A | 9/1994 |
| JP | 06-288478 | 10/1994 |
| JP | 06-300156 | 10/1994 |
| JP | 06-313491 | 11/1994 |
| JP | 07-151263 | 6/1995 |
| JP | 09-004734 | 1/1997 |
| JP | 9-286916 A | 11/1997 |
| JP | 10-267149 | 10/1998 |
| JP | 2000-265958 A | 9/2000 |
| JP | 2001-207494 | 8/2001 |
| JP | 2001-263503 A | 9/2001 |
| JP | 2002-005316 A | 1/2002 |
| JP | 2002-294072 | 10/2002 |
| JP | 2003-277604 A | 10/2003 |
| JP | 2005-076731 | 3/2005 |
| TW | 142424 | 9/1990 |

OTHER PUBLICATIONS

[Resin and Plastic], (Chemical Engineering Encyclopedia, special volume), edited by "Chemical Engineering Encyclopedia Editing Committee" and "Chemical Engineering Encyclopedia Editorial Section of Chemical Industry Publishing Co.", published by Chemical Industry Publishing Co., Jan. 2003, pp. 259 and 271, (Portions cited by SIPO: p. 259, Table 3 and p. 271, left column line 1 from the bottom, are summarized in the English language translation of Second Notice of Reasons for Rejection, Application No. 200480029635.9 by State Intellectual Property Office of the Peoples Republic of China dated Sep. 12, 2008).

English Translation of R.O.C. Office Action mailed Nov. 25, 2009.

European Search Report mailed on Mar. 23, 2012, in corresponding EP Application 04773761.4-2115.

* cited by examiner

RESIN MEMBER FOR VALVE

TECHNICAL FIELD

The present invention relates to a resin member for a valve which is used in chemical factories, or in various fields such as the food, petrochemistry, paper and pulp fields and, more particularly, to a light-weight resin member, for a valve, which has high strength and can be used at high temperature, and is also excellent in chemical resistance, corrosion resistance and weatherability.

BACKGROUND ART

Various members for a valve are used in various high temperature and high pressure lines and chemical solution lines. For example, a considerably high strength is required when a case body of a valve drive section and a valve body of a butterfly valve are used at high temperature under high pressure. Therefore, a member for a valve made of metal such as iron or aluminum has hitherto been used. However, as the member for a valve is sometimes used in applications (exposed outdoors, in a coastal zone, in a seawater environment) which require corrosion resistance and weatherability for a long period, poor operation may occur in a case body of the valve drive section made of metal and obstruction of opening and closing of a valve may occur in a valve body of a butterfly valve made of metal, and thus there arises a problem that long-period stability deteriorates. When used in various chemical solution lines, there arises a problem that leakage of a chemical solution is caused by erosion with a corrosive gas or a chemical solution in a member for a valve made of metal, particularly a butterfly valve body made of metal, and that some members for a valve sometimes cannot be used according to the kind of the chemical solution.

To solve these problems, the case body of the valve drive section made of metal was coated with an epoxy resin, while chemical resistance and corrosion resistance were improved by forming a resin or rubber lining in the valve body of the butterfly valve made of metal.

However, the following problems arose in the case body of the valve drive section made of metal coated with an epoxy resin.
1. As an epoxy resin is a very brittle resin, a coating film of the epoxy resin may be peeled off with ease when impact or stress is directly applied during transportation or use.
2. Even if impact or stress is not directly applied to the coated surface, when used in the environment with extremes of temperature, the valve drive section made of metal and the coated surface differ in an expansion coefficient and thus the coated surface may be peeled off with ease by repetition of thermal expansion and thermal contraction.
3. At the position where the coating film is peeled off, deterioration due to corrosion or poor operation may occur as in the case of the member for a valve made of metal which is not coated.
4. As the weight of the case body accounts for half or more of the weight of the valve drive section, the case body of the valve drive section made of metal is very heavy and thus it is difficult to carry and the workability becomes inferior.

In the valve body of the butterfly valve made of metal on which a resin or rubber lining is formed, similar to the coating of the above items 1 and 2, the lining can be peeled off. Similar to the above item 3, there can arise a problem that corrosion occurs at the position where the lining was peeled off. Similar to the above item 4, there can arise a problem that the case body becomes very heavy. Although the resin or rubber lining is not as brittle, compared with the epoxy resin, a thin lining is formed and therefore the lining may be peeled off when impact or stress is directly applied during transportation or use.

As means for solving the above problems, there has been proposed a method of forming a casing of a gear drive unit as a case body with a heat transfer and conducting synthetic resin (see, for example, Patent Document 1 (Japanese Unexamined Patent Publication (Tokukai) No. 7-151263, pages 1 to 4 and FIG. 1)). According to this method, the casing of the gear drive unit for valve is formed of a synthetic resin such as rigid vinyl chloride, epoxy or FRP and, even when used for a piping material through which a low temperature fluid flow, dew condensation occurs on the internal and external surfaces of the casing and a gear mechanism in the casing does not occur and therefore water droplets are not formed, and thus obstruction in operation due to rust can be prevented.

In the valve body of the butterfly valve, there is proposed a method of forming a valve box as the valve body with a fiber-reinforced resin (see, for example, Patent Document 2 (Japanese Unexamined Patent Publication (Tokukai) No. 6-288478, pages 1 to 5 and FIG. 4)). According to this method, a valve box of a butterfly valve made of a resin is formed by disposing a fiber-reinforced prefoam in a ring-shaped flask using a fiber-reinforced resin such as FRP, charging a resin solution while rotating the ring-shaped flask, passing the resin solution through the reinforcing fiber, and transferring outside thereby to gradually increase the thickness inside. Thus, there can be formed a valve box which is hardly corroded even if scratched by an external force or fluid pressure, and also has improve durability.

DISCLOSURE OF THE INVENTION

In the casing of the gear drive unit for valve formed of the synthetic resin, problems such as peeling of the coating film and corrosion at the position where the coating film is peeled off can be solved. However, when used in a normal temperature and high pressure line, the applicable pressure range is limited because the strength of the material is lower than that of those made of metal. When used in a high temperature and high pressure line, the physical properties of the resin such as rigid vinyl chloride drastically deteriorate at high temperature and the casing having drastically deteriorated physical properties may be damaged without enduring the stress applied to the casing during opening and closing of the valve.

In the valve box of the butterfly valve formed of the synthetic resin, although problems such as peeling of the lining and corrosion at the position where the lining is peeled off can be solved, when used in a normal temperature and high pressure line, the applicable pressure range is limited because the strength of the material is lower than that of those made of metal. When used in a high temperature and high pressure line, the working temperature is limited to about 60° C. in the rigid vinyl chloride. In the piping line in which the temperature exceeds 60° C., the valve box may be damaged or a leakage accident may occur, and thus it becomes impossible to use.

In light of the above problems of the prior art, the present invention has been made and an object thereof is to provide a light-weight member made of a resin for a valve, which has high strength and can be used in an atmosphere at high temperature, and is also excellent in chemical resistance and corrosion resistance.

A first feature for the constitution of the present invention is that a resin member for a valve is produced by molding a molding material having a tensile strength of 80 to 400 MPa;

a second feature at normal temperature is that a resin member for a valve is produced by molding a molding material having a tensile strength of 75 to 350 MPa at 120° C.; a third feature is that a resin member for a valve is produced by molding a molding material having a notched Izod impact strength of 15 to 100 KJ/m² at −20 to 120° C.; a fourth feature is that the resin member for valve is a case body of a valve drive section; and a fifth feature is that the resin member for a valve is a valve body of a butterfly valve.

The resin as a component of a resin composition used in the resin member for a valve of the present invention may be any resin such as thermoplastic resin or heat or radiation curable resin as far as physical properties of the resulting resin member satisfy the above values of physical properties. Examples thereof include epoxy acrylate resin, polyphenylene sulfide resin, engineering polyamide resin and polycarbonate resin, and a combination of an epoxy acrylate resin and a polyisocyanate resin is preferable. Curing agents can be added to the curable resin. Furthermore, fiber reinforcers are preferably added so as to provide the required physical properties described above. Various additives such as fillers can also be added.

The contents of the resin, the fiber reinforcer and the other additives as constituent components of the resin composition used in the resin member for a valve of the present invention can be appropriately selected with reference to the contents of the following examples so that physical properties of the resin member for valve of the present invention satisfy the above value of physical properties.

In the following description, a resin member for a valve produced by molding a molding material comprising a resin composition containing a specific epoxy acrylate resin (A), a specific polyisocyanate compound (B), a curing agent (C) and an internal mold release agent (D), and a fiber reinforcing material (E) will now be described in detail. When the above-described thermoplastic resin (X) is used, the resin (X) itself and the internal mold release agent (D) constitute the resin composition. The fiber reinforcing material, filler and other additives can also be added.

A sixth feature is that the resin member for a valve is produced by molding a molding material comprising a resin composition containing an epoxy acrylate resin (A) having a hydroxyl value of 60 to 100, a polyisocyanate compound (B) having 0.1 to 1.5 isocyanate groups per one hydroxyl group of the epoxy acrylate resin (A), a curing agent (C) and an internal mold release agent (D), and 20 to 70% by mass of a fiber reinforcing material (E), a sixth feature is that the resin member for a valve is produced by molding a molding material comprising 5 to 50 parts by mass of a scaly filler (F) based on 100 parts by mass of the epoxy acrylate resin (A), and an eighth feature is that the resin member for a valve is produced by molding a sheet- or bulk-shaped molding material.

DETAILED DESCRIPTION OF THE INVENTION

The tensile strength of the molding material used in the present invention is preferably within a range from 80 to 400 MPa, and more preferably from 120 to 300 MPa at normal temperature. It is necessary that the tensile strength is 80 MPa or more so as to obtain a sufficient strength in the use of a piping line. When the tensile strength is increased, a notched Izod impact strength (hereinafter referred to as an impact strength) rapidly decreases and damage tends to occur. Therefore, the tensile strength is preferably 400 MPa or less so as to maintain the impact strength and the tensile strength.

The tensile strength is preferably within a range from 75 to 350 MPa at 120° C., and more preferably from 90 to 300 MPa. It is necessary that the tensile strength is 75 MPa or more so as to obtain a sufficient strength under the environment used in a high-temperature line. Although the impact strength increases at high temperature as compared with the case at normal temperature, the impact strength rapidly decreases and damage tends to occur when the tensile strength increases. Therefore, the tensile strength is preferably 350 MPa or less so as to maintain the impact strength and the tensile strength.

The impact strength of the molding material is preferably within a range from 15 to 100 KJ/m², and more preferably from 30 to 65 KJ/m² at −20 to 120° C. It is necessary that the impact strength is 15 KJ/m² or more so that the resin member for a valve is not damaged even when large impact is applied at −20 to 120° C. When the impact strength is increased, the tensile strength rapidly decreases and the member for a valve tends to be inferior in rigidity. Therefore, the impact strength is preferably 100 KJ/m² or less so as to maintain the tensile strength and the impact strength.

The epoxy acrylate resin (A) used in the present invention is generally prepared by mixing an epoxy acrylate obtained from the reaction of an epoxy resin and an unsaturated monobasic acid with a polymerizable vinyl monomer as a reactive diluent. An epoxy resin component refers to a compound having at least two epoxy groups in a molecule and examples thereof include a diglycidyl ether type epoxy resin comprising, as a skeleton, a bisphenol compound typified by bisphenol A, bisphenol F or brominated bisphenol A; a polyglycidyl ether type epoxy resin comprising, as a skeleton, a multinucleated compound typified by phenol or cresol novolak, or brominated phenol novolak; a polyglycidyl ester type epoxy resin comprising, as a skeleton, an organic polybasic acid typified by dimer acid or trimellitic acid; and a glycidyl ether type epoxy resin comprising, as a skeleton, bisphenol A ethylene oxide, propylene oxide added glycol and a water added bisphenol A compound. These compounds may be used alone or in combination.

Examples of the unsaturated monobasic acid component include acrylic acid, methacrylic acid, crotonic acid and sorbic acid, and these acids can be used alone or in combination.

The epoxy acrylate resin (A) contains an epoxy acrylate having an acid as a pendant in the molecule obtained by reacting the epoxy resin component with the unsaturated monobasic acid and reacting the reaction product with a polybasic anhydride. Examples of the polybasic anhydride include maleic anhydride, phthalic anhydride, itaconic anhydride, citraconic anhydride, tetrahydrophthalic anhydride, tetrabromophthalic acid, trimellitic anhydride and 3,6-endomethylene 1,2,3,6-tetrahydro-phthalic anhydride.

For the purpose of improving physical properties and adhesion, a polyisocyanate compound (B) is mixed.

Examples of the polyisocyanate compound (B) include a diisocyanate or polyfunctional polyisocyanate such as 2,4-toluene diisocyanate, 2,6-toluene diisocyanate, 4,4'-diphenylmethane diisocyanate, isophorone toluene diisocyanate or hexamethylene diisocyanate, or an isocyanate polymer having an isocyanate group at the end obtained by reacting a polyetherpolyol or polyesterpolyol having a hydroxyl group with a diisocyanate compound.

The number of an isocyanate group of the polyisocyanate compound (B) is within a range from 0.1 to 1.5, and preferably from 0.5 to 1.2, based on one hydroxyl group of the epoxy acrylate resin (A).

For the purpose of preparing a non-sticky molding material by improving the mechanical properties, the number of the isocyanate group of the polyisocyanate compound (B) must be adjusted to 0.1 or more. For the purpose of preventing a foam from remaining in the molded article after molding by preventing excess isocyanate groups from reacting with moisture to cause foaming, the number of the isocyanate group of the polyisocyanate compound (B) must be adjusted to 1.5 or less.

The polymerizable vinyl monomer is used so as to improve operability and water resistance.

Styrene is generally used as the polymerizable vinyl monomer and examples thereof include crosslinkable vinyl monomers or vinyl oligomers, for example, vinyl compounds such as vinyltoluene, α-methylstyrene, chlorostyrene, dichlorostyrene, vinylnaphthalene, ethyl vinyl ether, methyl vinyl ketone, methyl acrylate, ethyl acrylate, methyl methacrylate, acrylonitrile and methacrylonitrile; and allyl compounds such as diallyl phthalate, diallyl fumarate, diallyl succinate and triallyl cyanurate. These monomers can be used alone or in combination.

For the purpose of improving moldability of the molding material, a curing agent (C) and an internal mold release agent (D) are mixed. The amount of the curing agent (C) is within a range from 0.5 to 2 parts by weight, and preferably from 0.8 to 1.2 parts by weight, based on 100 parts by weight of the resin component. The amount of the internal mold release agent (D) is within a range from 1.0 to 8.0 parts by weight, and preferably from 3.0 to 5.0 parts by weight, based on 100 parts by weight of the resin component.

Examples of the curing agent (C) include organic peroxides such as benzoyl peroxide, methyl ethyl ketone peroxide, peroxyperbenzoate, cumen hydroperoxide, tertiary butyl benzoate, peroxyketal and dicumyl peroxide.

Examples of the internal mold release agent (D) include conventional internal mold release agents, for example, higher fatty acid and higher fatty acid ester thereof such as stearic acid and a metal salt thereof, alkylphosphate ester and carnauba wax.

For the purpose of improving the strength of the molding material, a fiber reinforcing material (E) is mixed.

Examples of the fiber reinforcing material (E) include glass fiber, vinylon fiber, carbon fiber, phenol fiber, aramid fiber, polyester fiber, ultra-high molecular weight polyethylene fiber, and hybrid obtained by using carbon fiber in combination with aramid fiber or glass fiber. These fiber reinforcing materials are used alone or in combination.

It is necessary that the fiber reinforcing material (E) is mixed in the amount within a range from 20 to 70% by mass, and preferably from 30 to 60% by mass, based on the resin composition comprising the components (A) to (D). The amount must be 20% by mass or more so as to prevent the occurrence of scatter in strength of the molded article because of a small amount of the fiber reinforcing material (E). The amount must be 70% by mass or less so as to prevent the formation of a brittle section caused because the amount of the fiber reinforcing material increases and the amount of the resin component partially decreases and thus the strength of the molded article decreases and the amount of the glass component increases.

The fiber length of the fiber reinforcing material (E) is preferably within a range from 3 to 50 mm, and more preferably from 6 to 25 mm. When the fiber length is less or more than a preferable range, scatter in a dispersion state of the glass fiber occurs according to the molding method and scatter in strength of the molded article occurs. Therefore, it is necessary to adjust the fiber length within a preferable range. The fiber may be in the form of a bar, chopped mat or woven fabric.

The molding material comprising the components (A) to (E) may be mixed with a scaly filler (F) for the purpose of improving moldability and chemical resistance and water resistance of the molded article. The scaly filler (F) must be mixed in the amount within a range from 5 to 50 parts by mass, and preferably from 10 to 30 parts by mass, based on 100 parts by mass of the epoxy acrylate resin (F). The amount must be 5 parts by mass for the purpose of improving appearance of the molded article by improving moldability of the molding material. The amount must be 50 parts by mass or less so that it does not become difficult to mold the molding material because of too large viscosity.

Examples of the scaly filler (F) include inorganic substances such as mica and scaly graphite; and resin or film flakes obtained by molding or curing in the form of scales. These scaly fillers can be used alone or in combination.

To the molding material comprising the components (A) to (F), a low constrictive agent (G), other fillers (H) and a thickener (I) can be optionally added, and may be used after forming into a sheet or a bulk material.

Examples of the low constrictive agent (G) include polystyrene, polyvinyl acetate, polyethylene, polypropylene, polymethyl methacrylate, styrene-butadiene copolymer and saturated polyester.

As the filler (H), calcium carbonate is generally used and examples thereof include aluminum hydroxide, talc, clay, barium sulfate, alumina, silica sand, silica powder, glass beads, glass powder, glass balloon and white marble. These fillers are used alone or in combination.

Examples of the thickener (I) include polyisocyanate compound, metal alkoxides, divalent metal oxide and divalent metal hydroxide.

When the resin member for a valve of the present invention is produced by molding the molding material, heat pressure molding such as metal matched die (MMD) molding, sheet molding compounding (SMC) or bulk molding compounding (BMC) can be used. It is particularly preferable to use a sheet- or bulk-shaped molding material.

EFFECT OF THE INVENTION

The present invention has the construction described above and the following excellent effects can be obtained by employing the same.

(1) There can be obtained a resin member for a valve, which can overcome problems such as poor chemical resistance and poor corrosion resistance as well as high weight in a metal member for a valve, problems such as occurrence of peeling of a coating film or a lining in a metal member for a valve subjected to a coating or lining treatment, and problems such as poor mechanical strength such as tensile strength or impact strength in a conventional resin member for a valve.

(2) There can be obtained a resin member for a valve, which can be used without fear of damage in a high pressure line and is excellent in chemical resistance according to characteristics of the resin.

(3) Since the material has a tensile strength of 75 to 350 MPa at 120° C., the resulting resin member for a valve can be used in a high pressure line for a long period without fear of damage.

(4) Since the material has a notched Izod impact strength of 15 to 100 $KJ/m^2$ at −20 to 120° C., the resulting resin member for a valve can maintain sufficient strength without causing damage even when sudden impact is applied by fall or a water hammer.

(5) By using an epoxy acrylate resin molding material, the resulting resin member for a valve can be proof against high temperature and low temperature without deteriorating high mechanical strength and also can be sufficiently fit for use for a long time even under high pressure. There can be obtained a resin member for a valve, which is excellent in resistance to chemicals such as acid and alkali and is practice satisfactory even when used for a long period in a state of being exposed to outdoors under severe environment, and is also excellent in corrosion resistance.

(6) By adding a scaly filler to an epoxy acrylate resin molding material, moldability and appearance can be improved and also chemical resistance and water resistance of a resin member for a valve made of the epoxy acrylate resin molding material can be improved.

BEST MODE FOR CARRYING OUT THE INVENTION

Examples of the present invention will now be described with reference to FIG. 1 to FIG. 11, but the invention is not to be considered as limited by the following examples.

EXAMPLES

FIG. 1 is a perspective view showing a butterfly valve having a casing as a case body of a valve drive section (hereinafter referred to as a casing) of a valve drive section in a closed state according to a first embodiment of the present invention, and FIG. 2 is a longitudinal sectional view of FIG. 1. FIG. 3 is a plan view showing an internal structure of the valve drive section of FIG. 1, and FIG. 4 is a longitudinal sectional view of FIG. 3. FIG. 5 is a plan view showing an internal structure of a valve drive section in an open state, and FIG. 6 is a longitudinal sectional view of FIG. 5. FIG. 7 is a plan view showing distribution of stress applied to the casing of the valve body of FIG. 1. FIG. 8 is a perspective view of a valve body showing distribution of stress applied to the valve body of FIG. 1. FIG. 9 is a perspective view showing a butterfly valve having a casing of a valve drive section according to a second embodiment of the present invention. FIG. 10 is a longitudinal sectional view of FIG. 9, and FIG. 11 is a perspective view of a valve body showing distribution of stress applied to the valve body of FIG. 9.

A butterfly valve with a valve drive section having a casing according to Example 1 of the present invention will now be described with reference to FIG. 1 to FIG. 3.

In the drawings, the numerical reference 1 denotes a casing of a valve drive section and is made of a resin molding material obtained by adding 15 parts by mass of "mica" as a scaly filler (F) to an epoxy acrylate resin molding material which is prepared by impregnating a 60% glass fiber as a reinforcing material (G) with a resin composition comprising 80 parts by mass of "NEOPOL 8051" (trade name) manufactured by Japan U-PiCA Company, Ltd. as an epoxy acrylate resin (A), 20 parts by mass of "ISONATE 143L" manufactured by Dow Polyurethane Japan, Ltd. as a polyisocyanate compound (B), 1.0 parts by mass of "PERBUTYL Z" manufactured by NOF Corporation as a curing agent (C) and 4.0 parts by mass of "SZ-2000" manufactured by Sakai Chemical Industry Co., Ltd. as an internal mold release agent (D). The valve drive section has a worm 6 and a worm wheel 7, which are described hereinafter, built rotatably in it. One side of the casing 1 is provided with holes through which a shaft 5 attached to a below-described handle 4 penetrates. The casing is divided into an upper casing 1a and a lower casing 1b and the upper casing 1a and the lower casing 1b are joined with a bolt 2 and a nut 3. The casings 1a, 1b are provided with a hole, through which an axis of the below described worm wheel 7 penetrates, at the center. Underside of the lower casing 1b is provided with an external thread portion (not shown) for jointing the casing 1 and a valve body 8 of the below described butterfly valve via a top flange 9 by screwing a bolt 10 therebetween. The material of the casing 1 is an epoxy acrylate resin molding material having a tensile strength of 230 MPa at normal temperature and an impact strength of 55 KJ/m$^2$, but is preferably a molding material having a tensile strength of 80 to 400 MPa at normal temperature and an impact strength of 75 to 350 KJ/m$^2$ at 120° C., and more preferably a molding material having an impact strength of 15 to 100 KJ/m$^2$ at normal temperature to 120° C.

The casing 1 is made of a resin and is excellent in chemical resistance as compared with a casing made of metal, and therefore it can be used in various chemical solution lines according to the characteristics of the resin. When used in severe environment with extremes of temperature, a coating film is not peeled off even if thermal expansion and thermal contraction are repeated. The casing 1 made of the epoxy acrylate resin molding material of the present invention is excellent in resistance to chemicals such as hydrochloric acid and sodium hydroxide solution and is also excellent in weatherability, and thus the casing may not deteriorate when used in a state of being exposed outdoors for a long period. As the casing is light-weight as compared with metal and has the same weight as that of rigid vinyl chloride, even if the shaft 5, the worm 6 and the worm wheel 7 in the valve drive section are made of metal, the total weight of the valve drive section accounts for about 50% of the weight in case of the casing made of metal, and thus a light-weight valve drive section having physical properties required to the casing 1 can be obtained.

The numerical reference 4 denotes a handle provided on one side of the casing 1. A below-described shaft 5 is attached to the handle 4.

The numerical reference 5 denotes a shaft made of a die-cast zinc alloy in which a handle is attached to one end and a below-described worm 6 is attached to the other end by integral molding. The shaft 5 is fixed to a hole formed on one side of the casing 1 so as to be capable of swiveling in the state of being penetrated through the hole.

The numerical reference 6 denotes a worm gear made of a die-cast zinc alloy, which is engaged with a worm wheel 7 to be described later and is disposed so as to be freely rotatable in a casing 1.

The numerical reference 7 denotes a fan-shaped worm wheel made of a die-cast zinc alloy. The worm wheel 7 penetrates the casing 1 and is supported by the casing 1 so as to be capable of swiveling. A stem bush 15 which is fitted with a stem 13 of a below described butterfly valve is provided to penetrate through a lower portion of the worm wheel 7, so that the casing 1 and a valve body 8 of the butterfly valve are secured with each other while the stem bush 15 is fitted with the stem 13.

The numerical reference 8 denotes a valve body of the butterfly valve made of an epoxy acrylate resin molding material, similarly to the casing 1. A substantially disk-shaped top flange 9 is provided in an upper portion of the valve body 8. The valve body 8 has a substantially cylinder-shaped flow passage 11 formed at the center of the valve body 8, and a seat ring 16 is fitted in the flow passage 11 in contact with the inner circumferential surface thereof. Provided in a lower portion is a bearing recess 12 into which the lower end of the stem 13 is inserted. While the valve body 8 is made of an epoxy acrylate resin molding material having a tensile strength of 230 MPa and an impact strength of 55 kJ/m$^2$ at normal temperature, it may be made of a molding material having a tensile strength of 80 to 400 MPa at normal temperature, preferably a molding material having a tensile strength of 75 to 350 MPa at 120° C., and more preferably a molding material having an impact strength of 15 to 100 kJ/m² at −20° C. to 120° C.

Since the valve body 8 is made of a resin, it is excellent in chemical resistance as compared with a valve body made of metal, and can be used in various chemical solution lines according to properties of the resin. In the case of the valve body 8 made of the epoxy acrylate resin molding material of the present invention, in particular, excellent resistance to chemicals such as hydrochloric acid and a sodium hydroxide solution as well as excellent weatherability makes it possible to use the valve body in outdoors for a long period of time without fear of deterioration. Moreover, as the epoxy acrylate resin molding material is light-weight as compared with metal and has the same weight as that of rigid vinyl chloride, even if a below described stem 13 and other components are made of metal, the total weight of the valve drive section accounts for about 40% of the weight in case of the casing made of metal, and thus a light-weight valve drive section having the physical properties required of the valve body 8 can be obtained.

The numerical reference 13 denotes a stem. The stem 13 has a reduced diameter section 14 formed in the top portion of the stem having a diameter smaller than that of other portion of the stem. Upper end of the reduced diameter section 14 is disposed so as to protrude from a top flange 9 at the center thereof which is provided above the valve body 8, with the stem bush 15 fitted onto the upper end of the reduced diameter section which protrudes to the above. The stem 13 is provided with an O ring fitted on the upper portion thereof, so that the stem 13 penetrates the valve body 8 and the seat ring 16 rotatably in close contact therewith. The lower end of the stem 13 is rotatably inserted into the bearing recess 12 while being sealed by an O ring.

The numerical reference 16 denotes a circular seat ring which is fitted onto the inner circumferential surface of the flow passage 11 of the valve body 8. The seat ring 16 can be deformed so as to be fitted in the valve body 8 and assembled.

The numerical reference 17 denotes a substantially disk-shaped valve disc. The valve disc 17 is disposed in the valve body 8 at the center thereof, and is supported by the stem 13 which penetrates the valve disc 17 at the center thereof so as to be unable to move in relation to the stem. The valve disc 17 rotates inside of the valve body 8 as the stem 13 rotates, so as to open or close the valve as the periphery of the valve disc 17 moves away from or makes contact with the seat ring 16.

The operation of the valve drive section and the butterfly valve according to Example 1 will now be described below with reference to FIG. 3 to FIG. 6.

When the butterfly valve is closed (the valve drive section is in the state shown in FIG. 3 and FIG. 4), turning the operating wheel 4 in the direction to open the valve causes the worm gear 6, which is provided integrally with the shaft 5 which extends from the operating wheel 4 at the center thereof, to rotate so as to drive the worm wheel 7, which is engaged with the worm gear 6, to swivel. As the worm wheel 7 swivels, the stem 13 which pivotally supports the valve disc 17 which is linked to the shaft of the worm wheel 7 rotates, so that the valve disc 17 rotates and the periphery of the valve disc 17 moves away from the seat ring 16, thus opening the flow passage 11 and putting the valve in an open state. When the butterfly valve is open (the valve drive section is in the state shown in FIG. 5 and FIG. 6), turning the operating wheel 4 in the direction to close the valve causes a force, which works in a direction opposite to that described above, to be transmitted so that the valve disc 17 rotates and makes contact with the seat ring 16 on the periphery the valve disc 17, thereby shutting off the flow passage 11 and putting the valve in a closed state.

Stress generated in the casing 1 when the valve of Example 1 is operated to open or close will now be described with reference to FIG. 3 to FIG. 8.

When the valve is in a closed state as shown in FIG. 3 and the operating wheel 4 is turned in the direction to open the valve, tensile stress is generated in the casing 1 in the direction indicated by arrow in FIG. 3 and FIG. 4. When the valve is in an open state as shown in FIG. 5 and the operating wheel 4 is turned in the direction to close the valve, tensile stress is generated in the casing 1 in the direction indicated by arrow in FIG. 5 and FIG. 6. When the valve is used at an intermediate open position, fluid pressure exerts a force which works in the sense of closing the valve, so that a tensile stress is generated in the direction indicated by arrow (shown in FIG. 3 and FIG. 4) similarly to the case of operating the valve to open. As a result, when the valve is operated to open or close, or used at an intermediate open position, stress is concentrated in regions A1 and A2 of the casing 1 shown in FIG. 7. FIG. 7(A) is a plan view showing distribution of stress applied to the casing of the valve drive section shown in FIG. 1. FIG. 7(B) is a sectional view taken along lines X-X of FIG. 7(A).

When operating the valve drive section with standard human manual power to open or close the valve, the regions A1 and A2 of the casing 1 are required to have strength to sustain a tensile stress of 80 MPa, taking into account the safety factor for the dynamic load of the casing of the valve drive section. The tensile strength of 80 MPa is determined for a case of the operating wheel 4 of the valve drive section having diameter of 200 mm, tensile stress of about 40 MPa generated in A1 and A2 by the force transmitted to the gear mechanism by the standard manual operating force, and minimum safety factor of 2 being assumed for the dynamic load on the resin specifically is this example.

When used in a normal temperature and normal pressure line, stress concentration during opening or closing operation does not result in damage of the casing 1 of the present invention as it is made of a molding material having a tensile strength of 80 to 400 MPa. Also because the minimum safety factor of 2 is employed, damage does not occur even when a sporadically high stress is generated.

When used in a normal temperature and high pressure line, the casing 1 is subjected to a force which causes it to strain or deform, due to the stress concentration in A1 and A2. However, since the casing is suppressed from deforming when the tensile strength is in a range from 80 to 400 MPa, such problems will not be caused as the gears fail to properly engage with each other due to strain or deformation of the casing, the gear mechanism is prone to backlash and unusual sound is generated by the vibration of the valve.

When used in a high temperature and normal pressure line, as the casing 1 has a tensile strength in the regions A1 and A2 as well, it maintains the level of strength required for a material used in a piping material even when the tensile strength of the casing 1 has decreased to about one half of the initial strength as it is heated to the temperature of the high temperature line. When the casing has a tensile strength of 75 to 350 MPa at 120° C., it can be used in a high temperature atmosphere.

When used in a high temperature and high pressure line, the casing having a tensile strength of 75 to 350 MPa at 120° C. can endure the operation in the high temperature and high pressure line without being damaged, since the minimum safety factor of approximately 2 is employed for the load of about 40 MPa which is expected during opening and closing operations. In the case of the casing 1 made of the epoxy acrylate resin of the present invention, in particular, as it has a tensile strength of 135 MPa at 120° C. and can maintain high strength as the tensile strength is suppressed from decreasing at high temperatures, the casing 1 is capable of demonstrating a strength which is sufficient to endure use in the high temperature and high pressure line for a long period of time.

The impact strength of the casing 1 of Example 1 will now be described.

In order to endure direct impact which is normally expected during transportation or when it is dropped, the casing 1 having such a shape as in the present invention is required to have an impact strength of 10 $kJ/m^2$ or more so as to avoid damage, based on a stress analysis. In order to endure sudden impact caused by opening and closing operations and other causes, the impact strength of 1.5 times 10 $kJ/m^2$ should be considered. The casing can be used in a low temperature line or a high temperature line without being damaged, when an impact strength is from 15 to 100 $kJ/m^2$ at −20 to 1120° C.

When the casing 1 is used in a low temperature line, it is cooled down to the temperature of the low temperature line resulting in lower impact strength of the material. When impact strength is in a range from 15 to 100 $kJ/m^2$, the casing 1 can be used in the low temperature line without being damaged. The casing 1 made of an epoxy acrylate resin molding material of the present invention, in particular, can sufficiently endure an extended period of use, for example, in a high pressure line at a low temperature of −20° C., as the impact strength is prevented from decreasing, even at a low temperature, below an impact strength of 55 $kJ/m^2$.

Stress generated in the butterfly valve of Example 1 installed in a piping line under the influence of inner pressure of fluid will now be described below with reference to FIG. 8.

When the butterfly valve is installed in a piping line, stress is generated in the valve body 8 in such a direction as the valve body 8 expands from the center of the flow passage toward the outside, under the influence of the inner pressure of fluid flowing in the piping line. As a result, the pressure in the piping line generates tensile stress which is concentrated in the region B of the valve body 8 shown in FIG. 8.

In case the valve body 8 is subjected to fluid pressure of 1 MPa which is the operating pressure of an ordinary butterfly valve, a tensile stress of about 38 MPa is generated in the region B of the valve body 8. Applying the minimum safety factor of approximately 2 to this value, design strength to endure the tensile strength is set to 80 MPa at normal temperature.

The valve body 8 of the butterfly valve of the present invention is made of epoxy acrylate resin molding material having a tensile strength of 230 MPa, and can therefore be used in a high pressure line without being damaged even when the inner pressure suddenly surges in the valve body 8 due to water hammer or the like. While stress concentration in region B forces the valve body 8 to expand or deform, the valve body 8 is made of an epoxy acrylate resin molding material having a tensile strength of 230 MPa and, therefore, is prevented from being deformed, thus there is no possibility of fluid leaking due to expansion or deformation of the valve body 8.

The case of using the butterfly value of Example 1 in a high temperature line will now be described. When used in the high temperature line, it maintains the level of strength required for a material used in a piping material even when the tensile strength of the valve body 8 has decreased to about one half of the initial strength as it is heated to the temperature of the high temperature line. When the valve body has a tensile strength of 75 to 350 MPa at 120° C., it can endure the use in the high temperature without causing damage or leakage because the tensile strength is more than 38 MPa generated in the region B of the valve body 8 as a result of an influence of fluid pressure. The valve body of the butterfly valve 8 of the present invention is obtained by molding an epoxy acrylate resin molding material having a tensile strength of 135 MPa at 120° C. and can maintain high mechanical strength because a decrease in tensile strength is suppressed even at high temperature, and thus it can have a strength enough to endure the use in the high temperature and high pressure line for a long period of time.

The impact strength of the valve body 8 of Example 1 will now be described. In order to endure direct impact which is normally expected during transportation or when it is dropped, the valve body 8 having such a shape as in the present invention is required to have an impact strength of 10 $kJ/m^2$ or more so as to avoid damage, based on a stress analysis. In order to endure sudden impact caused by water hammer or the like, the impact strength of 1.5 times 10 $kJ/m^2$ should be considered. The valve body can be used in a low temperature line or a high temperature line without being damaged, when an impact strength is from 15 to 100 $kJ/m^2$ at −20 to 120° C.

When the valve body 8 is used in a low temperature line, it is cooled down to the temperature of the low temperature line resulting in lower impact strength of the material. When impact strength is in a range from 15 to 100 $kJ/m^2$, the casing can be used in the low temperature line without being damaged. The valve body 8 made of an epoxy acrylate resin molding material of the present invention, in particular, can sufficiently endure an extended period of use, for example, in a high pressure line at a low temperature of −20° C., as the impact strength is suppressed from decreasing, even at a low temperature, below an impact strength of 55 $kJ/m^2$.

A divided-type butterfly valve having a casing of the valve drive section according to Example 2 of the present invention will now be described with reference to FIG. 9 to FIG. 10.

The numerical reference 18 is an upper valve body of the butterfly valve made of the same epoxy acrylate resin molding material as in case of the casing 1 of Example 1. A substantially disk-shaped top flange 19 is provided in an upper portion of the upper valve body 18.

The numerical reference 20 is a lower valve body of the butterfly valve made of the same epoxy acrylate resin molding material as in case of the casing 1 of Example 1. Provided in a lower portion of the lower valve body 20 is a bearing recess 21 into which the lower end of the stem 30 is inserted.

The upper valve body 18 forms an opening together with the lower valve body 20. In the lower end of the upper valve body 18 and the upper end of the lower valve body 20, the upper valve body 18 is provided with a pair of protrusions 22, 23 protruding in a horizontal direction, while the lower valve body 18 is provided with a pair of protrusions 24, 25 protruding in a horizontal direction, and the protrusion 22 and the protrusion 24, as well as the protrusion 23 and the protrusion 25, are joined with a bolt 26 and a nut 27, respectively.

Similar to Example 1, since both valve bodies 18, 20 are made of a resin, they are excellent in chemical resistance as compared with a valve body made of metal, and can be used in various chemical solution lines according to properties of the resin. In the case of the valve bodies 18, 20 made of the epoxy acrylate resin molding material of the present invention, in particular, excellent resistance to chemicals such as hydrochloric acid and a sodium hydroxide solution as well as excellent weatherability makes it possible to use the valve body outdoors for a long period of time without fear of deterioration. Moreover, as the epoxy acrylate resin molding material is light as compared with metal and has the same weight as that of rigid vinyl chloride, even if the stem and other components are made of metal, the total weight of the valve drive section accounts for about 45% of the weight in case of the casing made of metal, and thus a light-weight valve drive section having physical properties required to the valve bodies 18, 20 can be obtained.

The numerical reference 28 denotes a circular seat ring made of a fluororesin which is fitted onto the inner circumferential surface of the opening formed of both valve bodies 18, 20. Both ends of the seat ring 28 are provided with a substantially disk-shaped collar 29. The seat ring 28 is provided with a hole, through which a below described stem 30 penetrates, on the upper portion and the lower portion, and an O ring is fitted between the collar 29 of the seat ring 28 and both valve bodies 18, 20.

As the butterfly valve of this example is used in the line which requires excellent corrosion resistance, a seat ring made of a fluororesin is used. It is difficult to deform the seat ring 28 made of fluororesin, like a rubber seat ring and, if the seat ring is forcibly deformed, there is a fear that microcracks occur in the seat ring 28 and the seat ring 28 made of the fluororesin is damaged during the use of the valve. Therefore, the seat ring 28 is interposed between both valve bodies 18, 20 of the butterfly valve divided into two sections so as to insert it into the space between collars 29 of the circular seat ring 28, and then the protrusion 22 and the protrusion 24 as well as the protrusion 23 and the protrusion 25 of both valve bodies 18, 20 are joined with a bolt 26 and a nut 27. Thus, the seat ring 28 made of the fluororesin can be fitted without being deformed.

The numerical reference 33 denotes a substantially disk-shaped valve disc made of a fluororesin. The valve disc 33 is disposed in both valve bodies 18, 20 at the center thereof, and is supported by the stem 30 which penetrates the valve disc 33 at the center thereof so as to be unable to move in relation to the stem. The valve disc 33 rotates inside of both valve bodies 18, 20 as the stem 30 rotates, so as to open or close the valve as the periphery of the valve disc 33 moves away from or makes contact with the seat ring 28. The valve disc 33 is made of a fluororesin or may be made of a fluororesin including an insert therein. In this case, the insert is connected with the stem 30 or is integrally formed.

The numerical reference 30 denotes a stem. The stem 30 has a reduced diameter section 31 formed in the top portion of the stem having a diameter smaller than that of the other portion of the stem 30. The upper end of the reduced diameter section 31 is disposed so as to protrude from a top flange 19 at the center thereof which is provided above the upper valve body 18, with the stem bush 32 fitted onto the upper end of the reduced diameter section 31 which protrudes to the above. The stem 30 is provided with an O ring fitted on the upper portion thereof, so that the stem 30 penetrates the upper valve body 18, the lower valve body 20 and the seat ring 28 in rotatable close contact therewith. The lower end is rotatably inserted into the bearing recess 21 while being sealed by an O ring.

The numerical reference 34 denotes a casing of the valve drive section made of the same epoxy acrylate resin molding material as in case of the casing 1 of Example 1. As the constitution of the casing 34 is the same as that in case of Example 1, a detailed description will be omitted.

Stress generated in the butterfly valve of Example 2 installed in a piping line under the influence of the inner pressure of a fluid will now be described below with reference to FIG. 11.

When the butterfly valve is installed in a piping line, a tensile stress is generated by an inner pressure applied by fluid in the piping line, similar to Example 1. Because of a structure in which valve bodies 18, 20 divided into two sections are joined with the bolt 26 and the nut 27, the pressure in the piping line generates tensile stress which is concentrated in the region C1 of the valve bodies 18, 20 shown in FIG. 11, similar to Example 1. Also the pressure in the piping line generates a higher tensile stress than that in C1, which is concentrated in the region C2 of protrusions 22, 23, 24 and 25 joined with the bolt 26 and the nut 27.

Therefore, it is necessary to design the structure of the valve bodies 18, 20 divided into two sections so as to impart sufficient strength to the regions C1, C2. Since it is necessary that the valve body is applied in the form of being interposed between flanges of the piping line and copes with various application standards, there is a limitation because of design restriction that the strength is increased by increasing the wall thickness so as to cope with concentration of stress in the regions C1, C2.

In case the tensile stress generated in the regions C1, C2 is applied to the valve bodies 18, 20 by a fluid pressure of 1 MPa, as a service pressure of the butterfly valve, when an assumption is made taking account of impact stress due to pulsation by which fluid pressure drastically varies continuously, tensile stress of about 40 MPa is generated in the region C1 of the valve bodies 18, 20 and also tensile stress of about 45 MPa is generated in the region C2. The valve bodies 18, 20 must be made of a material having a tensile strength of more than the tensile stress.

The valve bodies 18, 20 of the butterfly valve of the present invention are made of epoxy acrylate resin molding material having a tensile strength of 230 MPa, and, therefore, maintain strength enough to prevent damage even when tensile stress is concentrated in the region C2 of the two-divided type valve body. While stress concentration in the region C1, C2 forces the valve body to expand or deform, the valve body is made of an epoxy acrylate resin molding material having a tensile strength of 230 MPa and is therefore not deformed, thus there is no possibility of fluid leaking due to expansion or deformation of the valve bodies 18, 20.

The tensile stress generated in the region C2 includes stress generated by fluid pressure when the valve is used and stress generated by joining with the bolt 27 and the nut 26. Taking account of joining with the bolt 27 and the nut 26 and connection to the piping line through flange joint, the valve body made of a molding material having high creep strength is suited for use for a long period.

The case of using the butterfly value of Example 2 in a high temperature line will now be described.

When used in the high temperature and high pressure line, in the case of a molding material which causes a large decrease in tensile strength when used at high temperature, the temperature range is limited. In the case of the molding material having a tensile strength in a range from 75 to 350 MPa at high temperature of 120° C., it can maintain enough strength to allow neither damage nor leakage because the tensile strength is more than the tensile strength of 40 to 45 MPa assumed even when tensile stress is concentrated in the regions C1, C2 of the valve bodies 18, 20.

When used in the high temperature and high pressure line, as the molding material has a tensile strength in a range from 75 to 350 MPa at high temperature of 120° C., the resulting valve body can be used without causing damage. The valve bodies 18, 20 made of the epoxy acrylate resin molding material of the present invention have a tensile strength of 135 MPa at temperatures of 120° C. or higher and have the strength which is two times more than that of the assumed tensile stress and, therefore, can exhibit enough strength to sufficiently endure the use in the high temperature and high pressure line for a long time. Particularly, the valve bodies 18, 20 made of the epoxy acrylate resin molding material of the present invention have sufficient hardness and creep strength and cause less deformation due to long-period creep of the material and less dimensional change due to jointing with the bolt at protrusions 22, 23, 24 and 25 to be jointed with the bolt 26 and the nut 27.

The impact strength of the valve bodies 18, 20 of Example 2 will now be described.

In order to endure direct impact which is normally expected during transportation or when it is dropped, the valve bodies 18, 20 having such a shape as in the present invention is required to have an impact strength of 10 kJ/m² or more so as to avoid damage, based on a stress analysis. In order to endure sudden impact caused by water hammer or the like, the impact strength of 1.5 times 10 kJ/m² should be considered. The valve body can be used in a low temperature line or a high temperature line without being damaged, when an impact strength is from 15 to 100 kJ/m² at −20 to 120° C.

When the valve bodies 18, 20 are used in a low temperature line, they are cooled down to the temperature of the low temperature line resulting in a lower impact strength of the material. When impact strength is in a range from 15 to 100 kJ/m², the casing 1 can be used in the low temperature line without being damaged. The valve bodies 18, 20 made of an epoxy acrylate resin molding material of the present invention, in particular, can sufficiently endure an extended period of use, for example, in a high pressure line at a low temperature of −20° C., since the impact strength is suppressed from decreasing even at a low temperature with an impact strength of 55 kJ/m².

As the stress applied to the casing 34 is the same as that in case of Example 1, a detailed description is omitted.

Next, specimens made of a molding material used in the resin member for a valve of the present invention were produced and values of physical properties were compared. Physical properties of the resulting resin molding material were evaluated by the following procedures.

(1) Tensile Test

No. 1 specimen in accordance with the test method JIS K 7127 was produced and a tensile test was conducted in an atmosphere at 23±1° C. in accordance with JIS K 7127, and then a tensile strength was measured.

(2) Notched Izod Impact Test

No. 1 specimen in accordance with the test method JIS K 7124 was produced and a notched Izod impact test was conducted in an atmosphere at 23±1° C. in accordance with JIS K 7124, and then the impact strength was measured.

(3) Hot Tensile Test

A No. 1 specimen in accordance with the test method JIS K 7127 was produced and a hot tensile test was conducted in an atmosphere at 80±1° C. and 120±1° C. in accordance with JIS K 7127, and then a tensile strength was measured.

(4) Hot and Cold Notched Izod Impact Test

A No. 1 specimen in accordance with the test method JIS K 7124 was produced and a notched Izod impact test was conducted in an atmosphere at 120±1° C. and −20±1° C. in accordance with JIS K 7124, and then an impact strength was measured.

(5) Chemical Resistance Test

A tensile test specimen and a notched Izod impact test specimen were dipped in 35% hydrochloric acid at 25° C. and a 20% sodium hydroxide solution at 25° C. for 7 and 60 days. After measuring the weight after dipping, a change in weight between the specimen before dipping and the specimen after dipping was determined. After dipping for 7 and 60 days, a tensile test and an Izod impact test were conducted.

(6) Weatherability Test

A specimen for tensile test was subjected to an exposure test using a xenon arc light source in accordance with JIS K 7350. The exposure time and the dose are as follows: 100 hours and 20,940 KJ/m², 300 hours and 64,170 KJ/m², 1000 hours and 207,320 KJ/m² and 1500 hours and 324,600 KJ/m². The tensile strength after exposure was measured and compared.

(7) Moldability

An epoxy acrylate resin molding material was formed into SMC using a SMC making machine and then molded into a case body of a valve drive section using a press, and then the moldability in the molding process was confirmed and appearance of the resulting molded article was visually confirmed.

Example 1

Epoxy Acrylate Resin

A resin molding material was prepared by impregnating a 60% glass fiber as a reinforcing material (G) with a resin composition comprising 80 parts by mass of "NEOPOL 8051" (trade name) manufactured by Japan U-PiCA Company, Ltd. as an epoxy acrylate resin (A), 20 parts by mass of "ISONATE 143L" manufactured by Dow Polyurethane Japan, Ltd. as a polyisocyanate compound (B), 1.0 parts by mass of "PERBUTYL Z" manufactured by NOF Corporation as a curing agent (C) and 4.0 parts by mass of "SZ-2000" manufactured by Sakai Chemical Industry Co., Ltd. as an internal mold release agent (D). The resulting resin molding material was formed into SMC using a SMC using a SMC making machine (Superimplee, manufactured by Tsukishima Kikai Co., Ltd.) and then molded into a plate-shaped molded article measuring 30×300 mm×3 mm in thickness. Specimens were made from the plate-shaped molded article by cutting work and a tensile test, an Izod impact test, a hot tensile test and a hot and cold Izod impact test were conducted using the resulting molded articles. The results are shown in Table 1. Also a chemical resistance test was conducted using the specimens. The results are shown in Table 2. Similarly, a weatherability test was conducted. The results are shown in Table 3.

TABLE 1

|  |  | Atmosphere (° C.) | Example 1 Epoxy acrylate resin | Example 2 Polyphenylene sulfide resin | Example 3 Polyamide resin | Example 4 Polycarbonate resin | Comparative Example 1 Vinyl chloride resin |
|---|---|---|---|---|---|---|---|
| Tensile strength | (MPa) | 23 | 230 | 167 | 246 | 157 | 50 |
| Hot tensile strength | (MPa) | 80 | 170 | — | — | — | 10 |
|  |  | 120 | 135 | 84 | 98 | 70 | — |

TABLE 1-continued

|  |  | Atmosphere (° C.) | Example 1 Epoxy acrylate resin | Example 2 Polyphenylene sulfide resin | Example 3 Polyamide resin | Example 4 Polycarbonate resin | Comparative Example 1 Vinyl chloride resin |
|---|---|---|---|---|---|---|---|
| Izod impact strength | (KJ/m$^2$) | 23 | 55 | 17 | 16 | 14 | 5 |
| Cold Izod impact strength | (KJ/m$^2$) | −20 | 55 | 15 | 11 | 12 | 2 |
| Hot Izod impact strength | (KJ/m$^2$) | 120 | 60 | 21 | 40 | 15 | — |

TABLE 2

|  |  | Example 1 (Epoxy acrylate resin) | |
|---|---|---|---|
|  |  | 35% HCl | 20% NaOH |
| Tensile strength | Before dipping (MPa) | 230 | 230 |
|  | Dipping for 7 days (MPa) | 210 | 227.6 |
|  | Dipping for 60 days (MPa) | 183.1 | 142.5 |
| Impact strength | Before dipping (KJ/m$^2$) | 55 | 55 |
|  | Dipping for 7 days (KJ/m$^2$) | 54.3 | 51.2 |
|  | Dipping for 60 days (KJ/m$^2$) | 59.4 | 42 |
| Change in weight | Before dipping (%) | 100 | 100 |
|  | Dipping for 7 days (%) | 99.45 | 100.05 |
|  | Dipping for 60 days (%) | 99.25 | 100.32 |

TABLE 3

| | Example 1 (Epoxy acrylate resin) | | | | |
|---|---|---|---|---|---|
|  | After 0 hours | After 100 hours | After 300 hours | After 1000 hours | After 1500 hours |
| Tensile strength (MPa) | 230 | 245.5 | 245.1 | 215.2 | 207.4 |

Example 2

Polypheylene Sulfide

Using, as a polyphenylene sulfide having both excellent tensile strength and impact strength at a normal temperature, "FORTRON 1140T11" containing 40% by mass of a composite reinforced glass as a reinforcing material added therein manufactured by Polyplastics Co., Ltd., a plate-shaped molded article was obtained by molding. Specimens were made from the resulting molded article by cutting work and a tensile test, an Izod impact test, a hot tensile test and an Izod impact test were conducted using the resulting molded articles. The results are shown in Table 1.

Example 3

Polyamide

Using, as a polyamide having both excellent tensile strength and impact strength at normal temperature, "RENY NXG5050" containing 50% by mass of a glass as a reinforcing material added therein manufactured by Mitsubishi Engineering-Plastics Corporation, a plate-shaped molded article was obtained by molding. Specimens were made from the resulting molded article by cutting work and a tensile test, an Izod impact test, a hot tensile test and an Izod impact test were conducted using the resulting molded articles. The results are shown in Table 1.

Example 4

Polycarbonate

Using, as a polycarbonate having both excellent tensile strength and impact strength at normal temperature, "GSV2040R2" containing 40% by mass of a composite reinforced glass as a reinforcing material added therein manufactured by Mitsubishi Engineering-Plastics Corporation, a plate-shaped molded article was obtained by molding. Specimens were made from the resulting molded article by cutting work and a tensile test, an Izod impact test, a hot tensile test and an Izod impact test were conducted using the resulting molded articles. The results are shown in Table 1.

Comparative Example 1

Vinyl Chloride Resin

A resin composition prepared by mixing 100 parts by mass of a vinyl chloride resin having an average molecular weight of 800, 1.5 parts by mass of a tin-based stabilizer, 1.0 parts by mass of an ester-based wax, 0.5 parts by mass of polymer-based wax and 1.0 parts by mass of a processing aid was heat-melted using an injection molding machine and then injection-molded to obtain a disk-shaped molded article measuring 200 mm in diameter and 3 mm in thickness.

Specimens were made from the disk-shaped molded article and a tensile test, an Izod impact test, a hot tensile test and a cold Izod impact test were conducted using the resulting molded articles. The results are shown in Table 1.

As is apparent from the results shown in Table 1, the tensile strength in an atmosphere at normal temperature is 50 MPA in Comparative Example 1, while the tensile strength is at least 3 times larger than that of Comparative Example 1 in Example 1, Example 2, Example 3 and Example 4. Although the product of Comparative Example 1 can be used according to the application of the resin member for a valve, conditions such as working pressure are limited because the resin has poor rigidity. In Example 1, Example 2, Example 3 and Example 4, the tensile strength is within a range from 80 to 400 MPa at normal temperature and therefore the tensile strength is enough to attain a minimum safety factor of 2 against tensile stress applied during use of the resin member for a valve, and thus the resulting molded article can be used under a wide range of conditions without fear of damage and deformation.

In Comparative Example 1, the tensile strength in the atmosphere at 80° C. decreased to about ⅕ of the strength at normal temperature and the resulting specimen is not suited for use in a high-temperature line.

In Example 1, the resulting specimen is very suited for use in a high-temperature line because of less decrease in tensile strength in the atmosphere at a temperature such as 120° C. In Example 2 and Example 3, the tensile strength is within a range from 75 to 350 MPa and therefore the strength at high temperature is sufficient. In Example 4, the tensile strength is less than 75 MPa and the resulting molded article is slightly insufficient for use in a high-temperature line.

In Comparative Example 1, the impact strength in the atmosphere at normal temperature is 5 KJ/m$^2$ and the product of Comparative Example 1 can be used according to the application of the resin member for a valve, but is insufficient in mechanical strength. In Example 1, as the impact resistance is 10 times larger than that in Comparative Example 1, the resulting molded article has the strength and can be used under a wide range of conditions without fear of damage. In Example 2, as the impact strength is within the range from 15 to 100 KJ/m$^2$, the resulting molded article is suited for use as a resin member for a valve. In Example 3, as the impact strength is within the range from 15 to 100 KJ/m$^2$ but the impact strength decreases to 12 KJ/m$^2$ when water is absorbed, the resulting molded article is slightly insufficient in impact strength. In Example 4, as the impact strength is less than 15 KJ/m$^2$, the resulting molded article can be used as the member for a valve but is slightly insufficient in impact strength.

In the atmosphere at 120° C., as the impact strength increased in Example 1 to Example 4 and is within a range from 15 to 100 KJ/m$^2$, the resulting molded article is suited for use as a resin member for a valve.

In the atmosphere at −20° C., in Comparative Example 1, as the impact strength decreased to half or less of the impact strength at normal temperature and the resulting molded article may be easily damaged by impact upon dropping, therefore, the resulting molded article is not suited for use as a resin member for a valve. In Example 1, the impact strength is the same as that at normal temperature and the resulting molded article can be used even at −20° C. without fear of damage and is very suited for use in a low temperature and high pressure line. In Example 2, as the impact strength is within a range from 15 to 100 KJ/m$^2$, the resulting molded article has a strength enough to be used at low temperature. In Examples 3 and 4, as the impact strength is less than 15 KJ/m$^2$ and the impact strength is slightly insufficient, the resulting molded article is not suited for use in a low-temperature line.

As described above, the resin member for a valve made of the epoxy acrylate resin of the present invention can maintain high strength because mechanical strength is not drastically influenced by the temperature, and thus it has a strength enough to cause no damage when used in a long period under high internal pressure of the fluid, and is best suited for use as a resin member for a valve. In addition to the epoxy acrylate, a polyphenylene sulfone is suited for use.

As is apparent from the results shown in Table 2, as a rate of decrease in the tensile strength and impact resistance is within 10% after dipping in 35% hydrochloric acid for 7 days and a rate of change in weight is less than 1%, there is no particular problem. As a rate of decrease in the tensile strength is about 20% and required mechanical strength is far more than 80 MPa after dipping for 60 days, there is no particular problem. As a rate of decrease in impact strength is within 10% and a rate of change in weight is less than 1%, there is no particular problem. As a rate of decrease in the tensile strength and impact resistance is within 10% after dipping in a 20% sodium hydroxide solution for 7 days and a rate of change in weight is less than 1%, there is no particular problem. As a rate of decrease in tensile strength is slightly large such as 40% or less but the required tensile strength is more than 80 MPa at this point after dipping for 60 days, the resulting molded article is sufficient in chemical resistance. Since a rate of decrease in the impact strength is about 20% and required impact strength is far more than 15 KJ/m$^2$, there is no particular problem. Since a rate of change in weight is less than 1%, there is no particular problem. Therefore, the resin member for a valve made of the epoxy acrylate resin molding material is excellent in chemical resistance because deterioration of physical properties are suppressed even when dipped in 35% hydrochloric acid and a 20% sodium hydroxide solution for a long term.

As is apparent from the results shown in Table 3, a rate of decrease in tensile strength is within about 10% after exposure at a dose of 324,600 KJ/m$^2$ for 1500 hours, as compared with the tensile strength before exposure, and the tensile strength is maintained at 200 MPa or more. Although some color fading occurs, there is no particular problem. Therefore, the resin member for a valve made of the epoxy acrylate resin molding material is excellent in weatherability because deterioration of physical properties is suppressed even when stored for a long period in the state of being exposed outdoors.

Consequently, the resin member for a valve obtained by molding the epoxy acrylate resin molding material of the present invention can be widely used in applications of chemical products because of excellent resistance to an acid or alkali. As the resin member for a valve is also excellent in weatherability, there can be obtained a resin member for a valve having excellent corrosion resistance, which causes no problem even when used for a long period in the state of being exposed to outdoors under severe environment.

Next, molded articles were produced using a molding material used in the resin member for a valve of the present invention, which contains or does not contain a scaly filler, and moldability and appearance were compared.

Example 5

Epoxy Acrylate Resin Containing Scaly Filler

A resin molding material was prepared by impregnating a 60% glass fiber as a reinforcing material (E) with a resin composition comprising 80 parts by mass of "NEOPOL 8051" (trade name) manufactured by Japan U-PiCA Company, Ltd. as an epoxy acrylate resin (A), 20 parts by mass of "ISONATE 143L" manufactured by Dow Polyurethane Japan, Ltd. as a polyisocyanate compound (B), 1.0 parts by mass of "PERBUTYL Z" manufactured by NOF Corporation as a curing agent (C) and 4.0 parts by mass of "SZ-2000" manufactured by Sakai Chemical Industry Co., Ltd. as an internal mold release agent (D). Also 15 parts by mass of "mica" was added as a scaly filler (F). A valve body of a butterfly valve was obtained by compression molding of this resin molding material and appearance was confirmed. The results are shown in Table 4.

TABLE 4

| Scaly filler | Example 5<br>15 Parts by mass | Example 6<br>0 Parts by mass |
|---|---|---|
| Moldability | Good | Slightly poor |
| Appearance | Good | Poor |

Example 6

Epoxy Acrylate Resin Containing No Scaly Filler

A valve body of a butterfly valve was obtained by molding the same resin molding material as in Example 1 (no addition of a scaly filler (F)) using a SMC making machine and appearance was confirmed. The results are shown in Table 4.

As is apparent from the results shown in Table 4, when the scaly filler (F) is added in Example 5, the molding material is excellent in fluidity and is easily charged and thus moldability is improved. When the scaly filler (F) is not added in Example 6, the resulting molded article has rough surface and is inferior in appearance and is therefore inferior in surface smoothness. To the contrary, in Example 5, the resulting molded article has no surface roughness and is excellent in appearance and surface smoothness and thus appearance is improved. Consequently, moldability and appearance of the resin member for a valve can be improved by adding the scaly filler (F). When surface smoothness is excellent, because the degree of dipping of a chemical solution is suppressed as compared with the case of poor surface smoothness, chemical resistance and water resistance can be improved.

As described above, the resin member produced by molding an epoxy acrylate resin containing a scaly filler added therein of the present invention has improved moldability and smoothness and therefore it becomes easy to conduct a molding operation and appearance of the resulting molded article is improved.

In this example, the resulting specimen is a conventional butterfly valve or a butterfly valve having a shape in which a valve body is divided into two sections, but may be a wafer type, lug type or double flange type valve. It may be, in addition to the butterfly valve, any of a ball valve, a diaphragm valve, a gate valve and a stop valve, and the case body of the valve drive section may be manually, electrically or hydraulically operated, or air-operated. The member for a valve of the present invention is not specifically limited as far as it is a member which is used for a valve, such as joint for exclusive use for attachment of a valve, and protector of a valve.

BRIEF DESCRIPTION OF THE DRAWINGS

FIG. 7(A) is a plan view showing distribution of stress applied to the valve drive section of FIG. 1. FIG. 7(B) is a sectional view taken along lines X-X of FIG. 7(A).

EXPLANATION OF LETTERS OR NUMERALS

Figure 1:
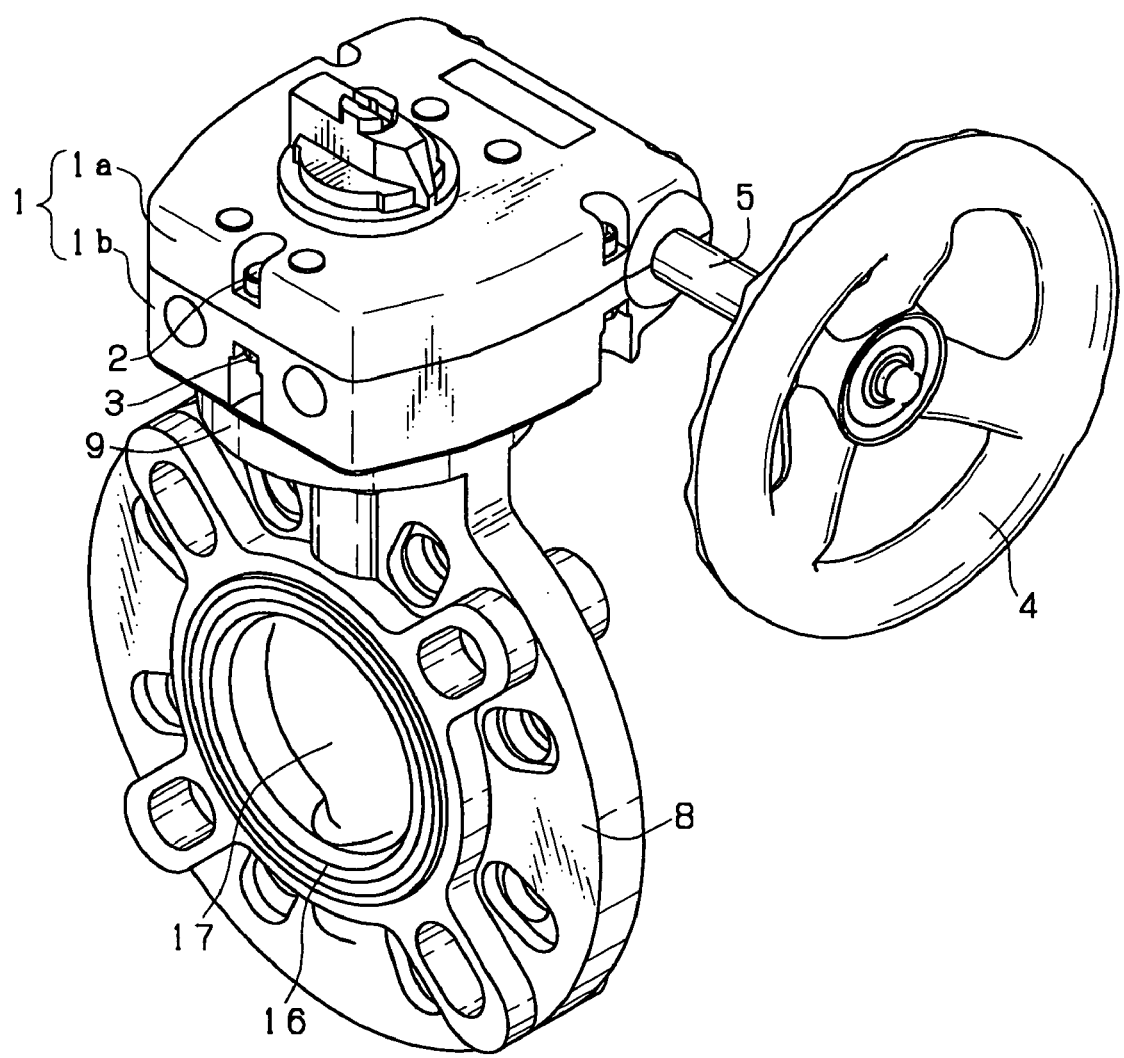
FIG. 1 is a perspective view showing a butterfly valve having a casing of a valve drive section in a closed state according to a first embodiment of the present invention.
Figure 2:
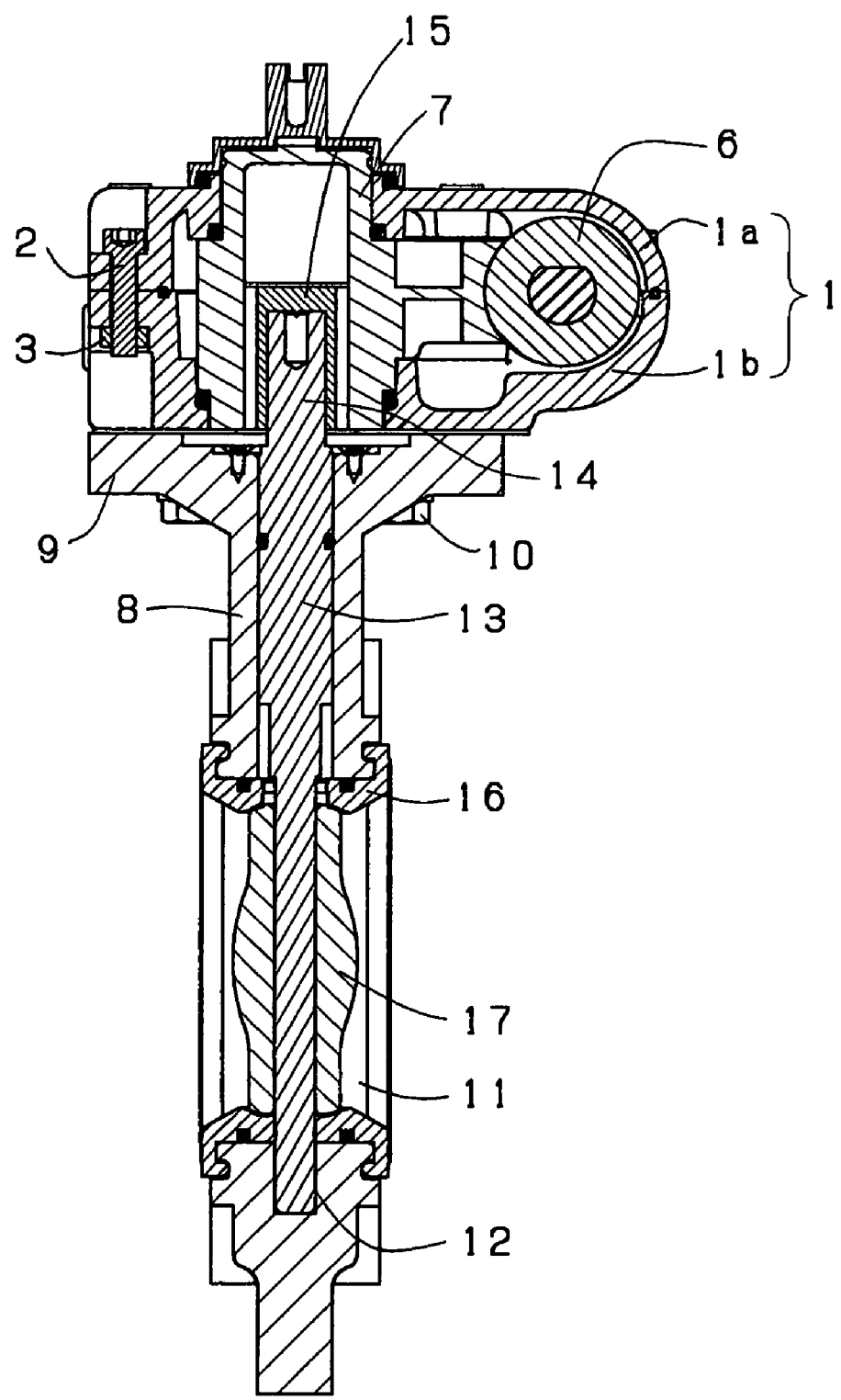
FIG. 2 is a longitudinal sectional view of FIG. 1.
Figure 3:
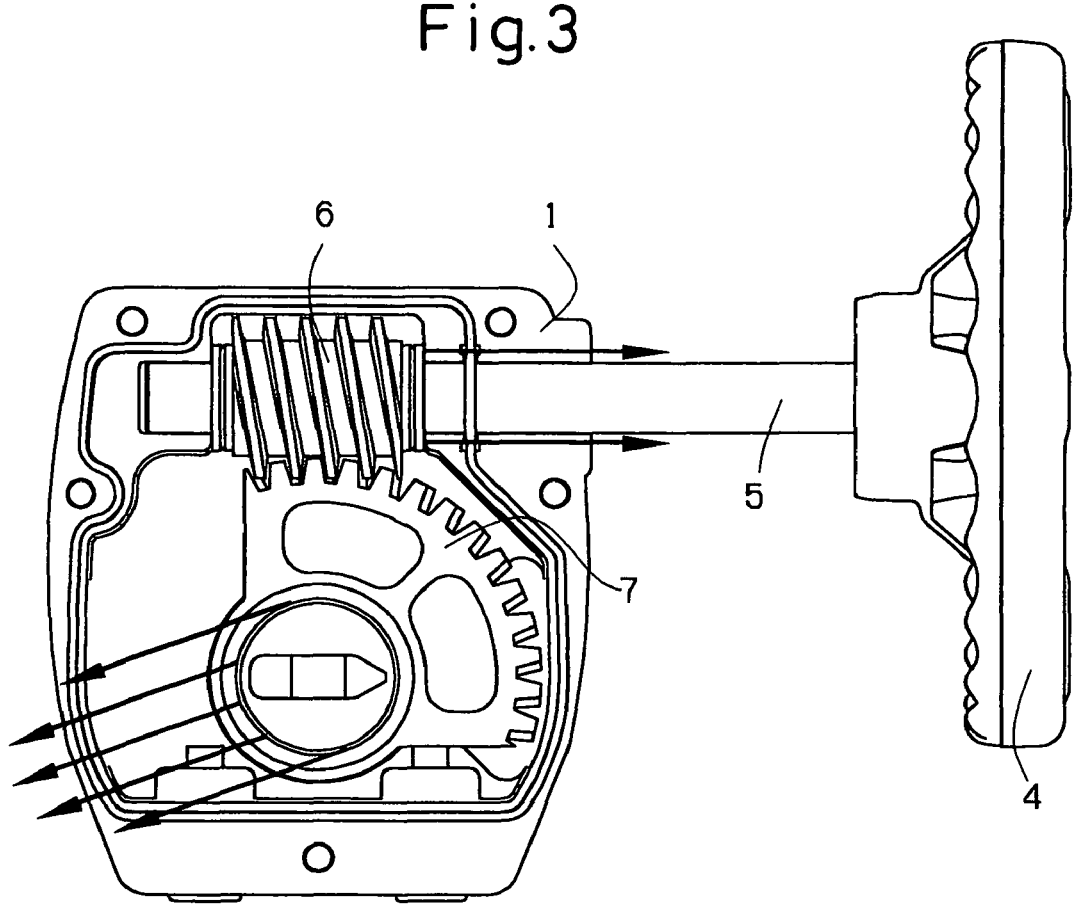
FIG. 3 is a plan view showing an internal structure of a valve drive section of FIG. 1.
Figure 4:
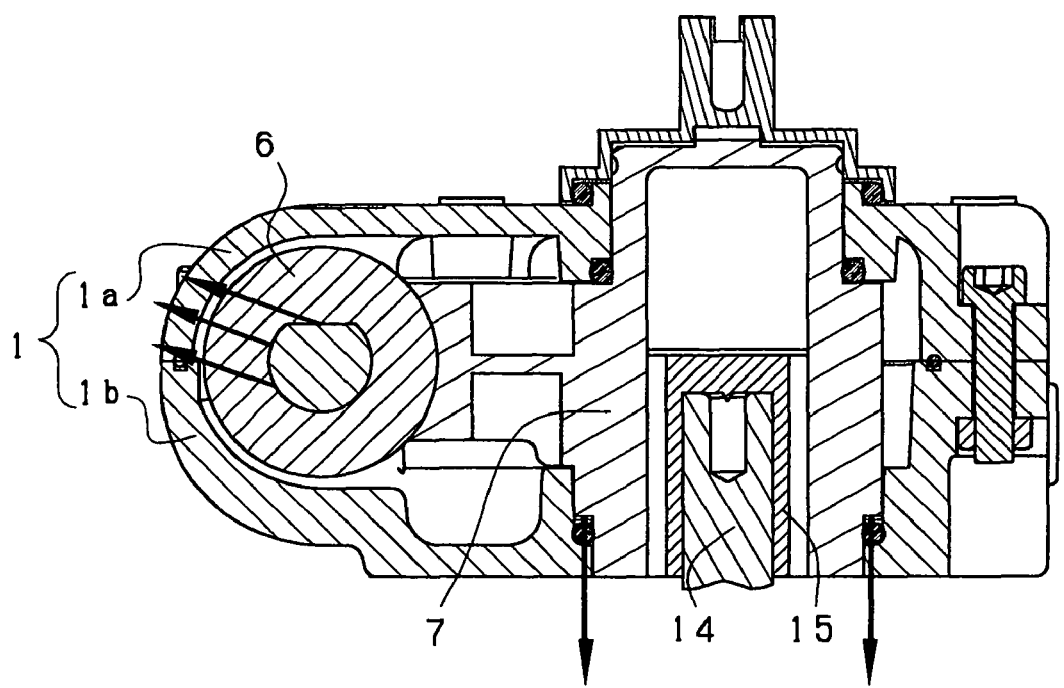
FIG. 4 is a longitudinal sectional view of FIG. 3.
Figure 5:
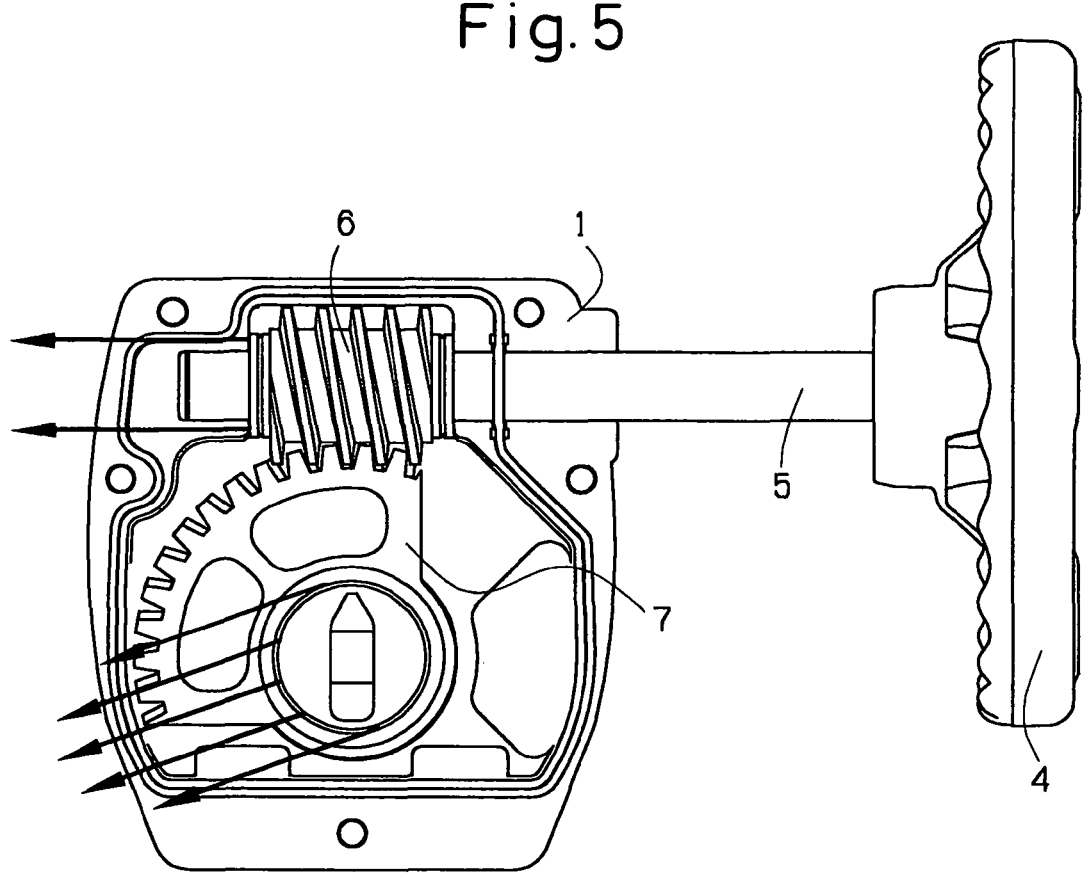
FIG. 5 is a plan view showing an internal structure of a valve drive section in an open state.
Figure 6:
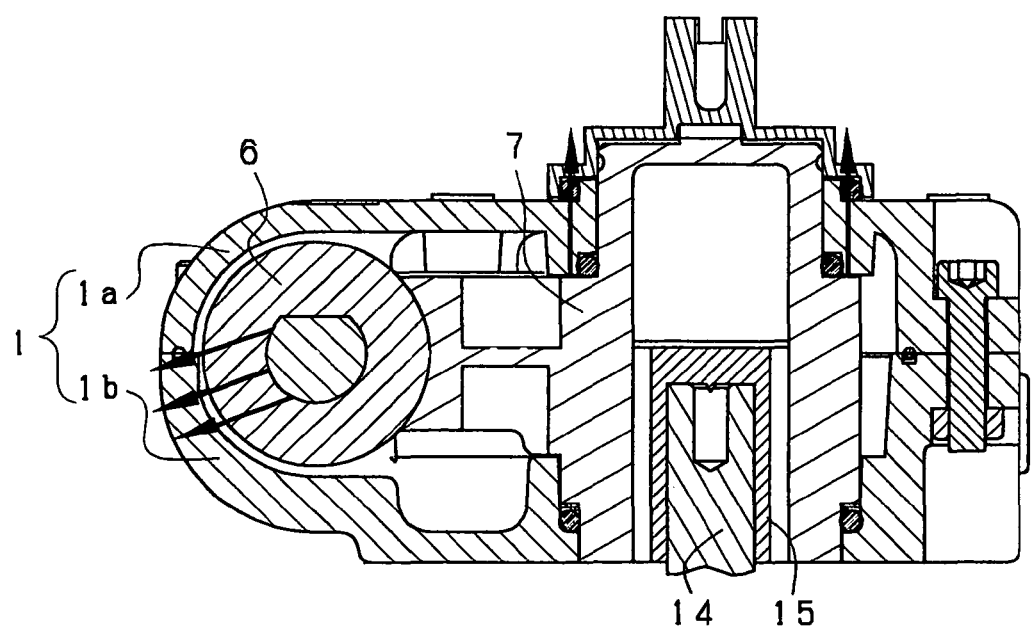
FIG. 6 is a longitudinal sectional view of FIG. 5.
Figure 7:
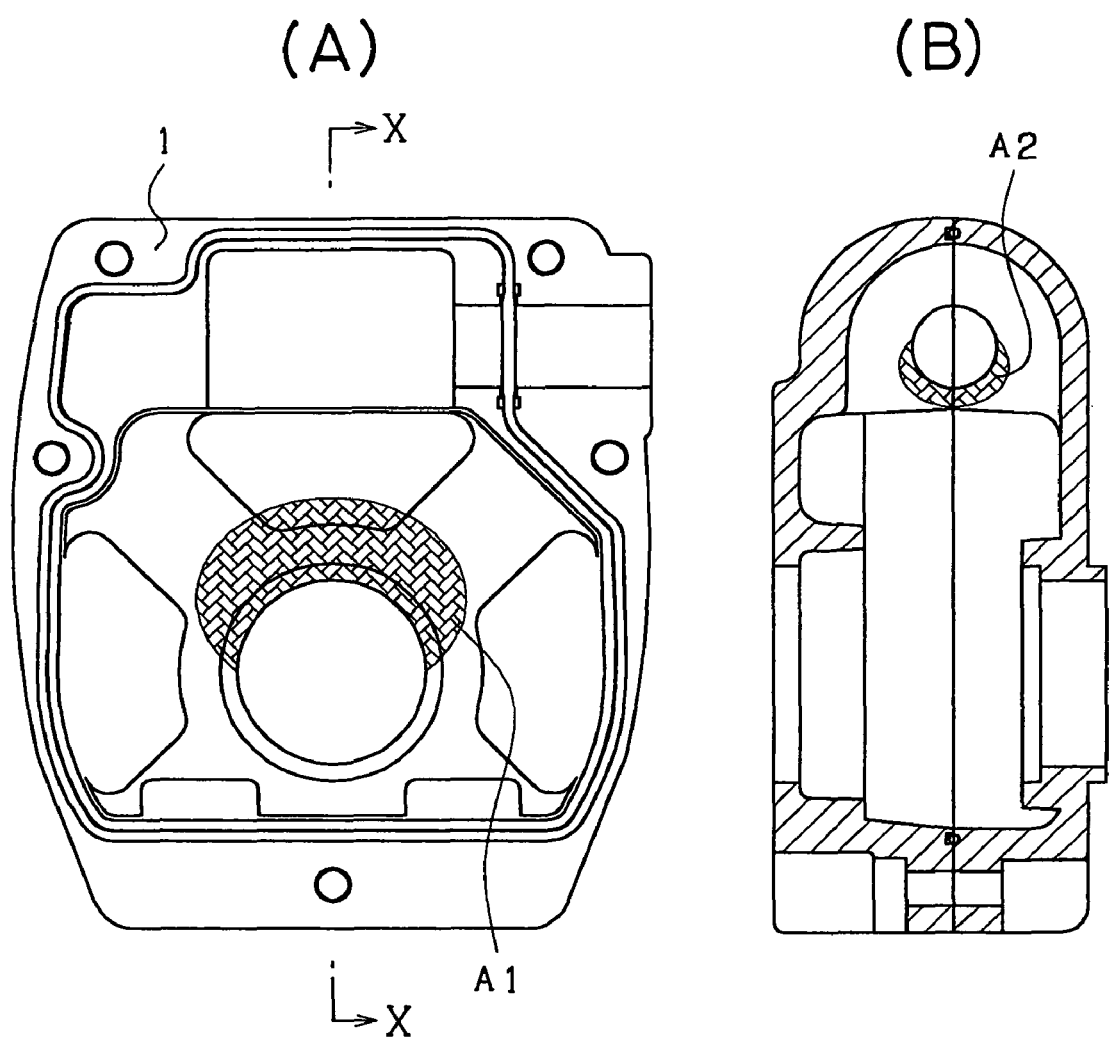
FIG. 7 is a schematic view showing distribution of stress applied to the casing of the valve body of FIG. 1.
Figure 8:
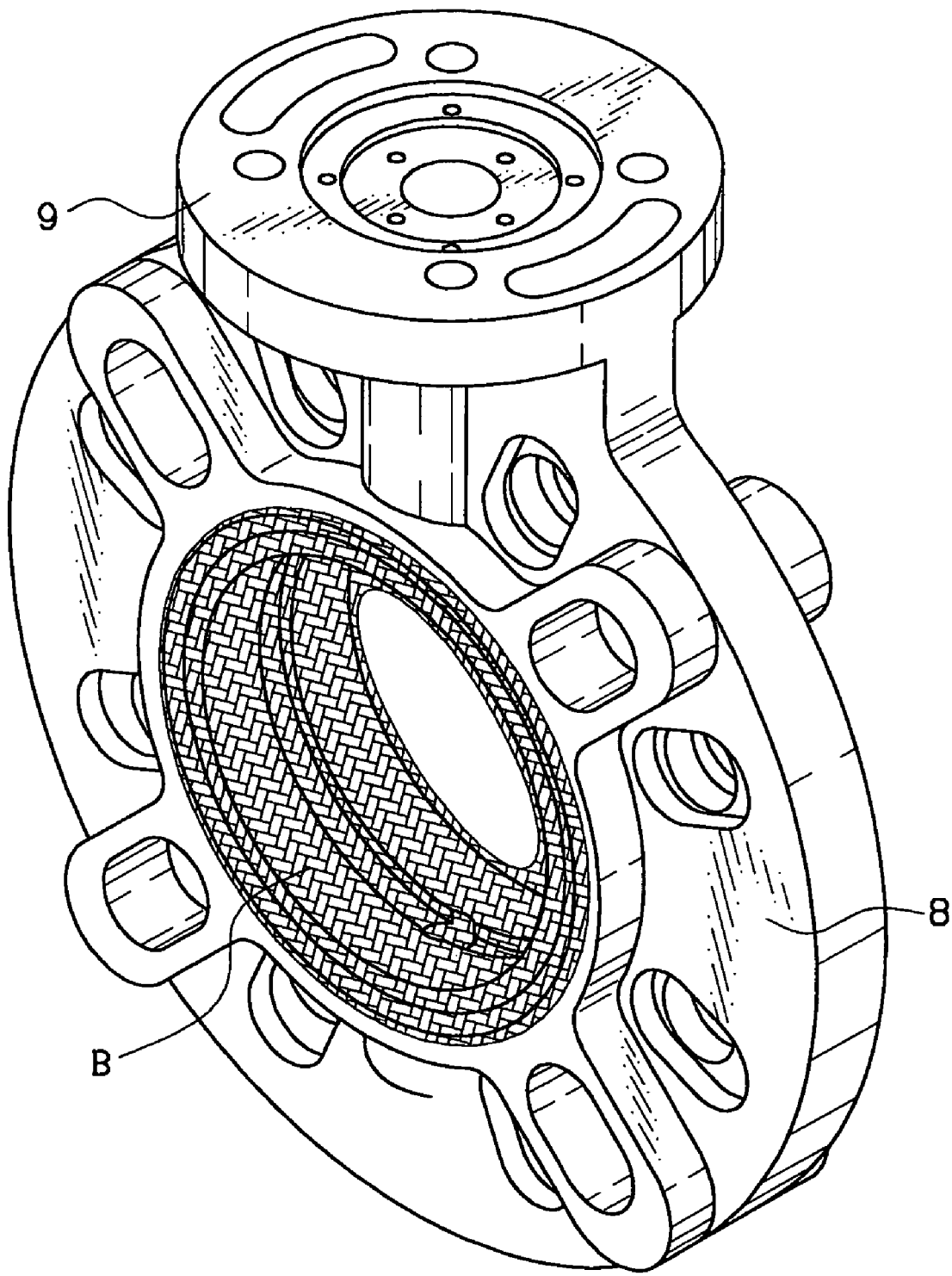
FIG. 8 is a perspective view of a valve body showing distribution of stress applied to the valve body of FIG. 1.
Figure 9:
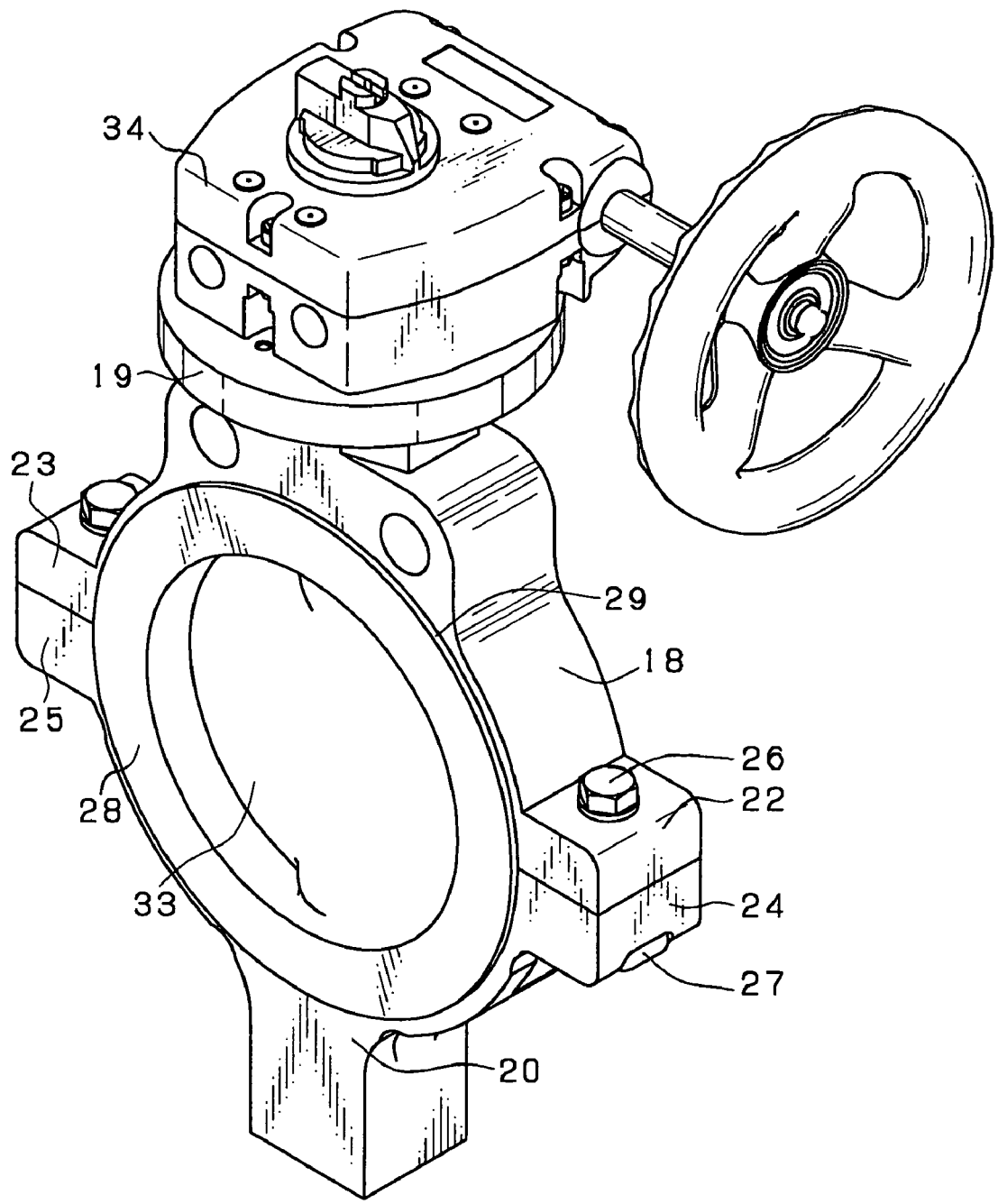
FIG. 9 is a perspective view showing a butterfly valve having a casing of a valve drive section in a closed state according to a second embodiment of the present invention.
Figure 10:
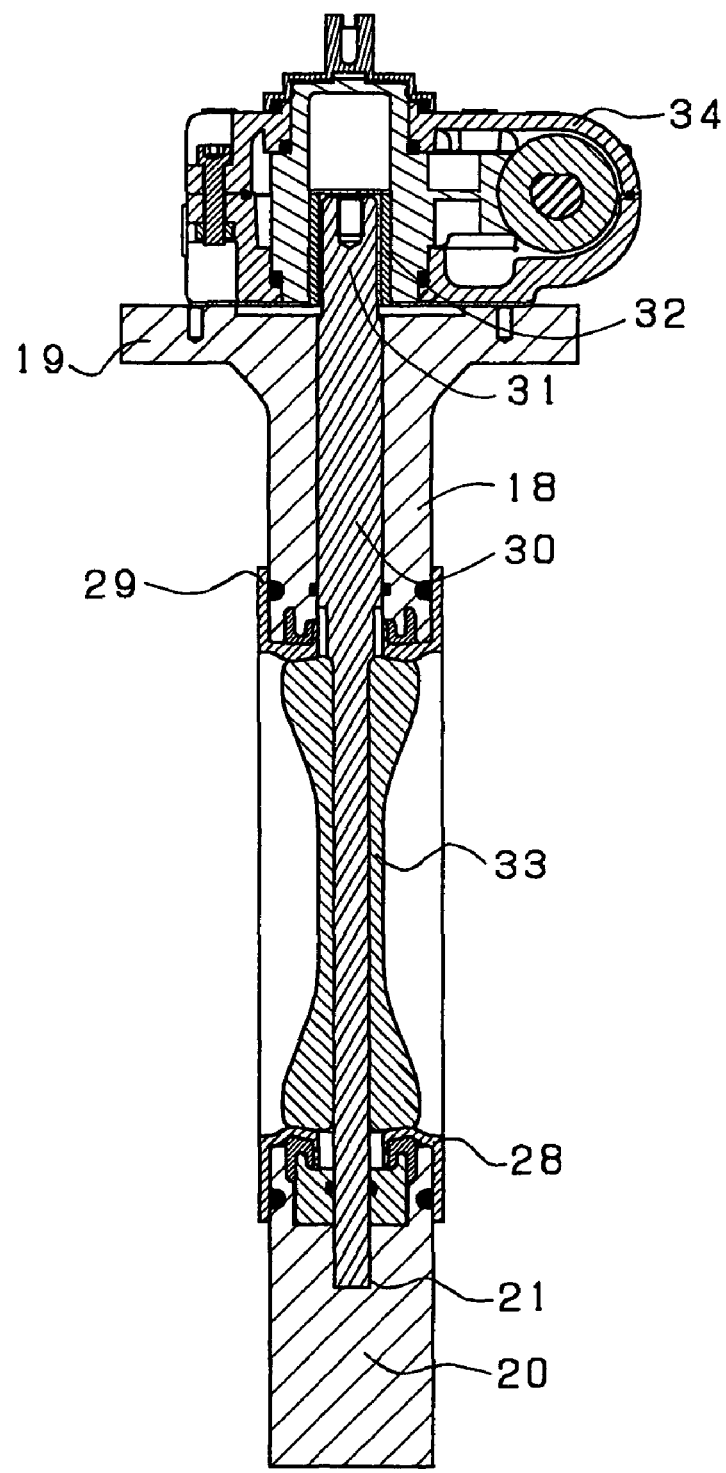
FIG. 10 is a longitudinal sectional view of FIG. 9.
Figure 11:
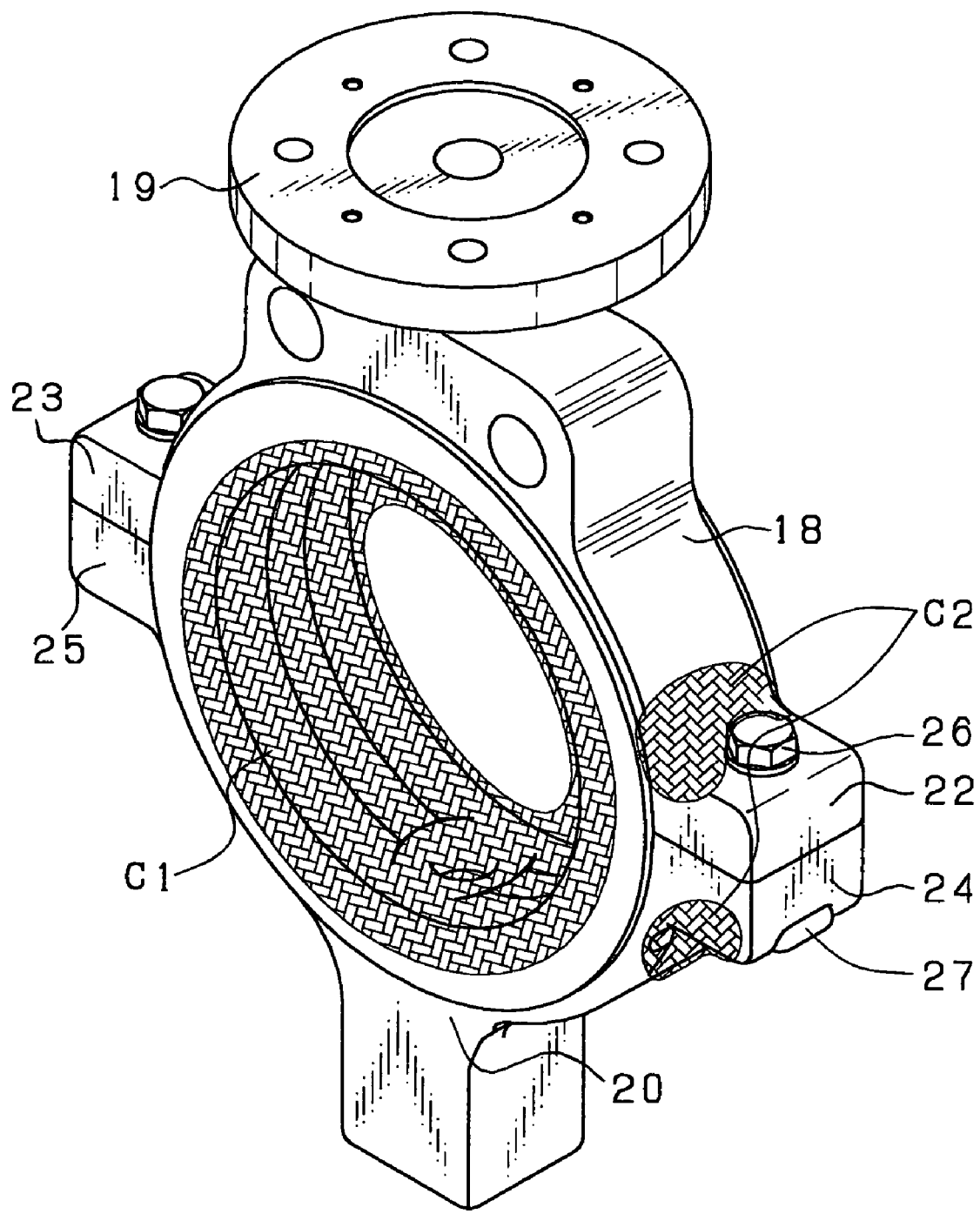
FIG. 11 is a perspective view of a valve body showing distribution of stress applied to the valve body of FIG. 9.

1 Casing
2 Bolt
3 Nut
4 Handle
5 Shaft
6 Worm
7 Worm wheel
8 Valve body
9 Top flange
10 Bolt
11 Flow passage
12 Bearing recess
13 Stem
14 Reduced diameter section
15 Stem bush
16 Seat ring
17 Valve disc
18 Upper valve body
19 Top flange
20 Lower valve body
21 Bearing recess
22 Protrusion
23 Protrusion
24 Protrusion
25 Protrusion
26 Bolt
27 Nut
28 Seat ring
29 Collar
30 Stem
31 Reduced diameter section
32 Stem bush
33 Valve disc
34 Casing
A1, A2, B, C1, C2 Stress concentration region

The invention claimed is:

1. A resin member for a valve, wherein said resin member is a housing of a gear box which is produced by molding a molding material having a tensile strength of 80 to 400 MPa at normal temperature, wherein the molding material comprises a resin composition containing an epoxy acrylate resin (A) having a hydroxyl value of 60 to 100, a polyisocyanate compound (B) having 0.1 to 1.5 isocyanate groups per one hydroxyl group of the epoxy acrylate resin (A), a curing agent (C), an internal mold release agent (D), and 20 to 70% by mass of a fiber reinforcing material (E).

2. The resin member for a valve according to claim 1, wherein the molding material further comprises 5 to 50 parts by mass of a scaly filler (F) based on 100 parts by mass of the epoxy acrylate resin (A).

3. A resin member for a valve, wherein said resin member is a housing of a gear box which is produced by molding a molding material having a tensile strength of 80 to 400 MPa at normal temperature and a tensile strength of 75 to 350 MPa at 120° C., wherein the molding material comprises a resin composition containing an epoxy acrylate resin (A) having a hydroxyl value of 60 to 100, a polyisocyanate compound (B) having 0.1 to 1.5 isocyanate groups per one hydroxyl group of the epoxy acrylate resin (A), a curing agent (C), an internal mold release agent (D), and 20 to 70% by mass of a fiber reinforcing material (E).

4. The resin member for a valve according to claim 3, wherein the molding material further comprises 5 to 50 parts by mass of a scaly filler (F) based on 100 parts by mass of the epoxy acrylate resin (A).

5. A resin member for a valve, wherein said resin member is a housing of a gear box which is produced by molding a molding material having a tensile strength of 80 to 400 MPa at normal temperature and a notched Izod impact strength of 15 to 100 KJ/m$^2$ at −20 to 120° C., wherein the molding material comprises a resin composition containing an epoxy acrylate resin (A) having a hydroxyl value of 60 to 100, a polyisocyanate compound (b) having 0.1 to 1.5 isocyanate groups per one hydroxyl group of the epoxy acrylate resin (A), a curing agent (C), an internal mold release agent (D), and 20 to 70% by mass of a fiber reinforcing material (E).

6. The resin member for a valve according to claim 5, wherein the molding material further comprises 5 to 50 parts by mass of a scaly filler (F) based on 100 parts by mass of the epoxy acrylate resin (A).

7. A resin member for a valve, wherein said resin member is a housing of a gear box which is produced by molding a molding material having a tensile strength of 80 to 400 MPa at normal temperature, a tensile strength of 75 to 350 MPa at 120° C. and a notched Izod impact strength of 15 to 100 KJ/m$^2$ at −20 to 120° C., wherein the molding material comprises a resin composition containing an epoxy acrylate resin (A) having a hydroxyl value of 60 to 100, a polyisocyanate compound (b) having 0.1 to 1.5 isocyanate groups per one hydroxyl group of the epoxy acrylate resin (A), a curing agent (C), an internal mold release agent (D), and 20 to 70% by mass of a fiber reinforcing material (E).

8. The resin member for a valve according to claim 7, wherein the molding material further comprises 5 to 50 parts by mass of a scaly filler (F) based on 100 parts by mass of the epoxy acrylate resin (A).

\* \* \* \* \*